United States Patent
Cho et al.

(10) Patent No.: US 11,310,514 B2
(45) Date of Patent: Apr. 19, 2022

(54) ENCODING METHOD AND APPARATUS USING NON-ENCODING REGION, BLOCK-BASED ENCODING REGION, AND PIXEL-BASED ENCODING REGION

(71) Applicant: SAMSUNG ELECTRONICS CO., LTD., Suwon-si (KR)

(72) Inventors: Dae-sung Cho, Seoul (KR); Chan-yul Kim, Bucheon-si (KR); Jeong-hoon Park, Seoul (KR); Pil-kyu Park, Seongnam-si (KR); Kwang-pyo Choi, Anyang-si (KR); Dai-woong Choi, Seoul (KR); Woong-il Choi, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 792 days.

(21) Appl. No.: 15/538,853

(22) PCT Filed: Dec. 30, 2014

(86) PCT No.: PCT/KR2014/013051
§ 371 (c)(1),
(2) Date: Jun. 22, 2017

(87) PCT Pub. No.: WO2016/104854
PCT Pub. Date: Jun. 30, 2016

(65) Prior Publication Data
US 2018/0014022 A1 Jan. 11, 2018

(30) Foreign Application Priority Data
Dec. 22, 2014 (KR) .................. 10-2014-0186369

(51) Int. Cl.
H04N 19/167 (2014.01)
H04N 19/169 (2014.01)
(Continued)

(52) U.S. Cl.
CPC ........ *H04N 19/167* (2014.11); *H04N 19/103* (2014.11); *H04N 19/132* (2014.11);
(Continued)

(58) Field of Classification Search
CPC .. H04N 19/102; H04N 19/103; H04N 19/105; H04N 19/182; H04N 19/176; H04N 19/172
See application file for complete search history.

(56) References Cited

U.S. PATENT DOCUMENTS 6,477,201 B1 * 11/2002 Wine .................. H04N 19/172
375/240.08
8,249,154 B2 8/2012 Chen
(Continued)

FOREIGN PATENT DOCUMENTS

CN  101310534 A  11/2008
CN  101535941 A  9/2009
(Continued)

OTHER PUBLICATIONS

Communication dated Jan. 3, 2017, issued by the Korean Intellectual Property Office in corresponding Korean Application No. 10-2014-0186369.
(Continued)

*Primary Examiner* — Jayanti K Patel
*Assistant Examiner* — Christopher Kingsbury Glover
(74) *Attorney, Agent, or Firm* — Sughrue Mion, PLLC

(57) ABSTRACT

Encoding an image using a non-encoding region of the image, a block-based encoding region of the image, and a pixel-based encoding region of the image.

13 Claims, 20 Drawing Sheets

(51) Int. Cl.
    *H04N 19/103*    (2014.01)
    *H04N 19/59*     (2014.01)
    *H04N 19/124*    (2014.01)
    *H04N 19/13*     (2014.01)
    *H04N 19/176*    (2014.01)
    *H04N 19/182*    (2014.01)
    *H04N 19/61*     (2014.01)
    *H04N 19/132*    (2014.01)
    *H04N 19/156*    (2014.01)
    *H04N 19/436*        (2014.01)
    *H04N 19/46*         (2014.01)
    *H04N 7/01*          (2006.01)

(52) U.S. Cl.
    CPC ......... *H04N 19/156* (2014.11); *H04N 19/169* (2014.11); *H04N 7/0127* (2013.01); *H04N 19/124* (2014.11); *H04N 19/13* (2014.11); *H04N 19/176* (2014.11); *H04N 19/182* (2014.11); *H04N 19/436* (2014.11); *H04N 19/46* (2014.11); *H04N 19/59* (2014.11); *H04N 19/61* (2014.11)

(56) References Cited

U.S. PATENT DOCUMENTS

| | | | |
|---|---|---|---|
| 8,493,390 B2 | 7/2013 | Kalinli | |
| 8,605,113 B2 | 12/2013 | Chen et al. | |
| 8,948,530 B2 | 2/2015 | Wee et al. | |
| 2007/0058714 A1* | 3/2007 | Noda | H04N 19/176 375/240.03 |
| 2007/0074251 A1 | 3/2007 | Oguz et al. | |
| 2009/0232207 A1 | 9/2009 | Chen | |
| 2009/0300692 A1* | 12/2009 | Mavlankar | H04N 21/234318 725/94 |
| 2010/0260259 A1* | 10/2010 | Kimmich | H04L 1/0003 375/240.07 |
| 2011/0033127 A1* | 2/2011 | Rasmusson | G06T 9/00 382/238 |
| 2012/0082209 A1* | 4/2012 | Li | H04N 19/176 375/240.02 |
| 2014/0348227 A1* | 11/2014 | Lee | H04N 19/463 375/240.03 |
| 2015/0016501 A1* | 1/2015 | Guo | G06T 9/00 375/240.02 |
| 2015/0130823 A1* | 5/2015 | Kim | G09G 5/18 345/522 |
| 2015/0201199 A1* | 7/2015 | Gu | H04N 19/167 375/240.02 |
| 2016/0173890 A1* | 6/2016 | Hattori | H04N 19/33 375/240.25 |

FOREIGN PATENT DOCUMENTS

| | | |
|---|---|---|
| CN | 103559006 A | 2/2014 |
| JP | 2007-81474 A | 3/2007 |
| JP | 2013-46319 A | 3/2013 |
| KR | 10-2009-0001339 A | 1/2009 |
| KR | 10-2009-0040038 A | 4/2009 |
| KR | 10-2009-0097688 A | 9/2009 |
| KR | 10-2014-0027040 A | 3/2014 |
| KR | 10-2014-0055066 A | 5/2014 |

OTHER PUBLICATIONS

Communication dated Jan. 18, 2016, issued by the Korean Intellectual Property Office in corresponding Korean Application No. 10-2014-0186369.

Communication dated Apr. 18, 2017, issued by the Korean Intellectual Property Office in corresponding Korean Application No. 10-2017-0043096.

International Search Report and Written Opinion, issued by International Searching Authority in corresponding International Application No. PCT/KR2014/013051, dated Jul. 7, 2015, (PCT/ISA/210, PCT/ISA/237, & PCT/ISA/220).

Communication dated Aug. 22, 2019, from the State Intellectual Property Office of People's Republic of China in counterpart Application No. 201480084671.9.

* cited by examiner

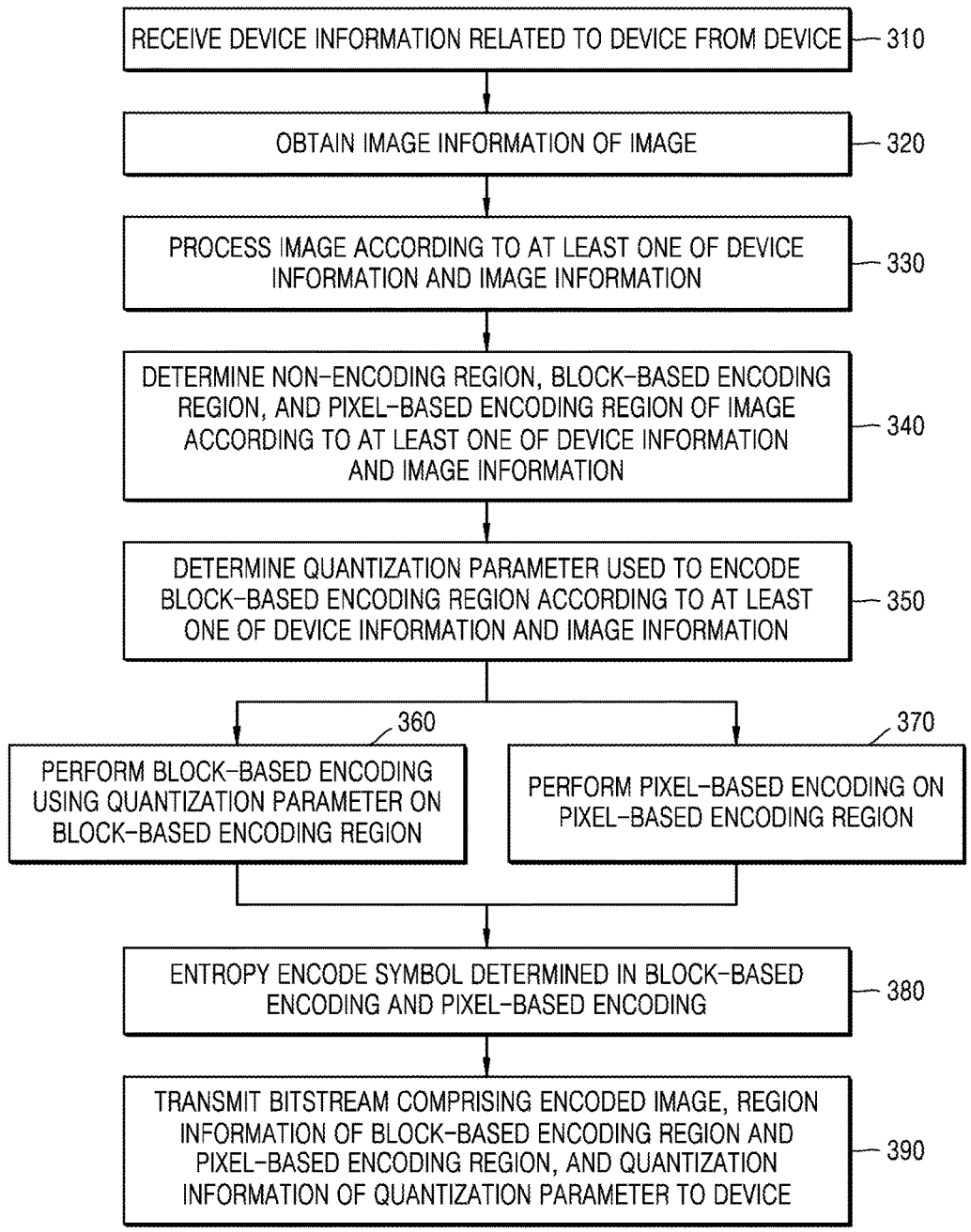

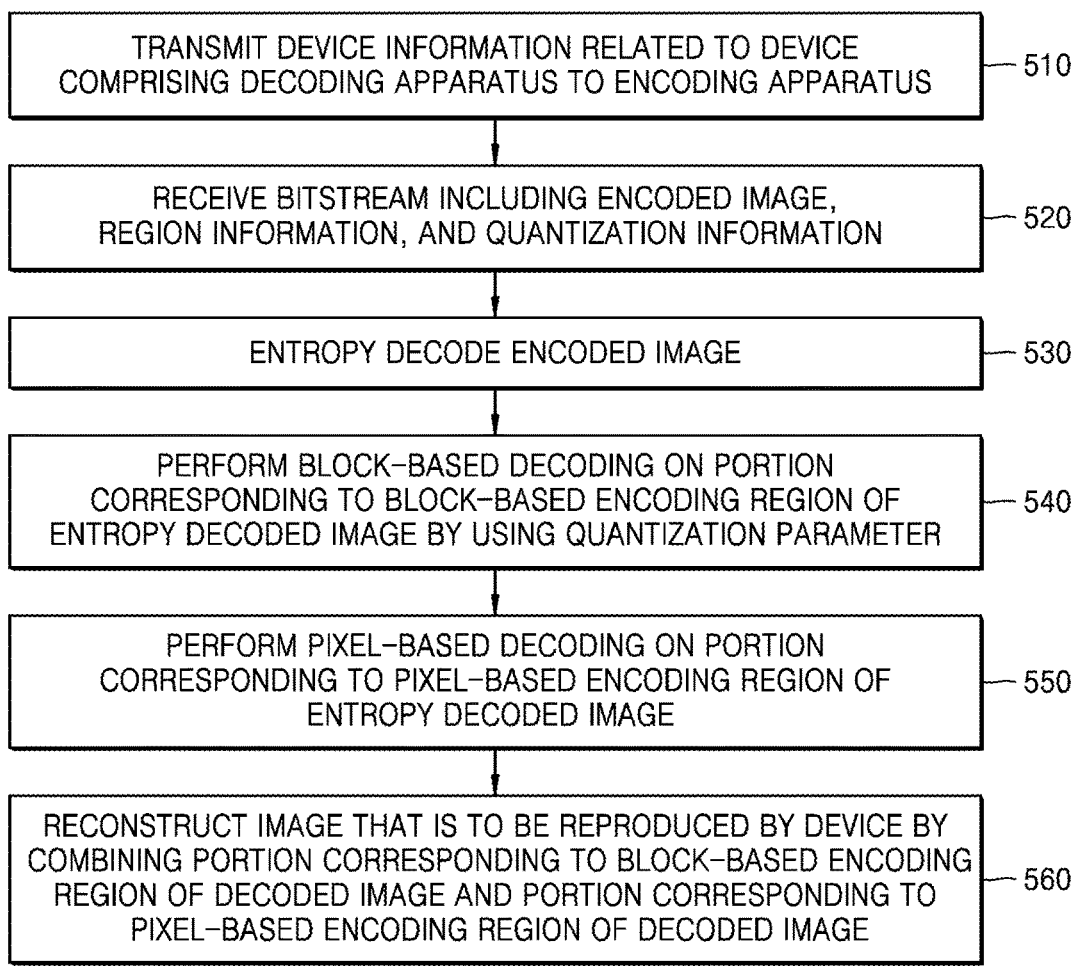

| 32 | 31 | 30 | 33 | 62 | 90 | 122 | 151 |
|----|----|----|----|----|----|-----|-----|
| 31 | 31 | 31 | 60 | 60 | 90 | 150 | 120 |
| 32 | 33 | 30 | 61 | 90 | 90 | 180 | 120 |
| 32 | 30 | 60 | 60 | 124 | 90 | 180 | 152 |
| 30 | 61 | 90 | 120 | 150 | 90 | 240 | 180 |
| 60 | 93 | 119 | 150 | 179 | 90 | 273 | 210 |
| 124 | 151 | 180 | 210 | 240 | 90 | 300 | 240 |
| 180 | 210 | 240 | 243 | 271 | 90 | 240 | 242 |

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 2 |
| 1 | 1 | 1 | 1 | 1 | 2 | 2 | 2 |
| 1 | 1 | 1 | 1 | 2 | 2 | 3 | 4 |
| 1 | 1 | 1 | 1 | 2 | 3 | 4 | 5 |
| 1 | 1 | 1 | 2 | 2 | 4 | 5 | 7 |

| | C (1424) | B (1422) | |
| | A (1420) | X (1410) | |
| | | | |

FIG. 15A

ORIGINAL BLOCK

PALETTE

| 0 | 0 | 0 | 0 | 0 | 0 | 0 | 0 |
|---|---|---|---|---|---|---|---|
| 1 | 1 | 1 | 1 | 1 | 1 | 0 | 0 |
| 0 | 0 | 0 | 0 | 0 | 0 | 0 | 0 |
| 0 | 0 | 2 | 3 | 3 | 3 | 3 | 3 |
| 0 | 0 | 2 | 2 | 0 | 0 | 0 | 0 |
| 0 | 0 | 2 | 2 | 2 | 0 | 0 | 0 |
| 0 | 0 | 2 | 2 | 2 | 0 | 0 | 0 |
| 0 | 0 | 2 | 2 | 2 | 0 | 0 | 0 |

INDEX MAP

ENCODING METHOD AND APPARATUS USING NON-ENCODING REGION, BLOCK-BASED ENCODING REGION, AND PIXEL-BASED ENCODING REGION

TECHNICAL FIELD

The present disclosure relates to image encoding methods and apparatuses and image decoding methods and apparatuses, and more particularly to, image encoding methods and apparatuses and image decoding methods and apparatuses based on image information of images and device information of image reproducing devices.

BACKGROUND ART

Performance of mobile devices such as smart phones and digital cameras continues to improve. Therefore, the amount of digital content consumed in mobile devices is increasing exponentially. As multimedia data such as images occupy about 60% of the storage/transmission capacity of digital content, an efficient image compression method for reducing capacity of multimedia data is required.

In particular, unlike a general consumer electronics (CE) use environment, in the case of wearable devices such as smart glasses and smart watches, batteries, screen shapes, storage spaces, or transmission bandwidths are severely restricted. Therefore, in order to popularize wearable devices, there is a need for a method capable of increasing compression performance with respect to multimedia data within a limit that users of the wearable devices do not recognize.

DETAILED DESCRIPTION OF THE INVENTION

Technical Problem

An embodiment of an image encoding method and apparatus and an image decoding method and apparatus are provided. A non-transitory computer-readable recording medium on which a program for executing an encoding method or a decoding method according to an embodiment of the present disclosure on a computer is disclosed. The technical problem to be solved by the present embodiment is not limited to the above-mentioned technical problems, and other technical problems may be deduced from the following embodiments.

Technical Solution

An encoding apparatus for encoding an image comprises: a communicator configured to receive, from a device, device information related to the device; and a processor configured to encode the image by using image information of the image and the device information, wherein the processor is further configured to process the image according to at least one of the device information and the image information, determine a non-encoding region, a block-based encoding region, and a pixel-based encoding region of the image according to at least one of the device information and the image information, performs block-based encoding on the block-based encoding region by using a quantization parameter determined according to at least one of the device information and the image information, perform pixel-based encoding on the pixel-based encoding region, generates an encoded image by entropy encoding a symbol determined by the block-based encoding or the pixel-based encoding, and generate a bitstream comprising the encoded image, region information of the block-based encoding region and the pixel-based encoding region, and quantization information of the quantization parameter, and wherein the communicator is further configured to transmit the bitstream to the device.

The processor is further configured to perform intra prediction or inter prediction on a coding unit of the block-based encoding region, transform residual data generated from intra prediction or inter prediction of a block-based encoding region, and quantize the transformed residual data by using the quantization parameter.

The processor is further configured to perform pixel-based prediction on an adjacent pixel with respect to each of pixels of the pixel-based encoding region, match residual data generated from pixel-based prediction of a pixel-based encoding region with a repeated residual string of the residual data, and compress the residual data by using a length and position information of the residual string.

The processor is further configured to generate an index map comprising an index corresponding to colors indicated by pixels of the pixel-based encoding region, match the index map with a repeated index string of the index map, and compress the index map by using a lens of the index string and position information.

The communicator is further configured to receive display shape information about a shape of a display included in a device reproducing the image, and wherein the processor is further configured to determine a region of the image that is not displayed on the display as the non-encoding region according to the display shape information, and wherein the non-encoding region is a region that is not encoded.

The processor is further configured to split the image into a plurality of regions, expand sizes of the split regions such that the split regions are split in an integer number of coding units used by a block-based encoding region, obtain an area ratio of the expanded regions with respect to unexpanded regions, and determine the regions as one of the block-based encoding regions and the pixel-based encoding regions according to the area ratio.

The processor is further configured to obtain color information indicating the number of colors constituting the image, determine, according to the color information, a region in which the number of used colors is below a threshold value as the pixel-based encoding region, and determine the region in which the number of used colors is above the threshold value as the block-based encoding region.

The processor is further configured to obtain pixel gradient information indicating values indicating size differences between pixel values of adjacent pixels with respect to pixels included in the image, select a maximum value from among the values indicating the size differences between the pixel values of the adjacent pixels according to the pixel gradient information, determine a region in which the maximum value is above a threshold value as the pixel-based encoding region, and determine a region in which the maximum value is below the threshold value as the block-based encoding region.

The processor acquires pattern information about a pattern in which pixels included in the image are distributed, and determines a region in which a distribution pattern of the pixels exists and lengths of pixel values repeated according to the distribution pattern are above a threshold value as a pixel-based encoding region according to the pattern information, and a region in which the distribution pattern does not exist or the lengths of the pixel values repeated according to the distribution pattern are below the threshold value as a block-based encoding region.

The communicator receives display resolution information of a display included in a device reproducing the image, and the processor obtains image resolution information of the image and determines the quantization parameter according to a ratio of an image resolution and a display resolution calculated from the display resolution information and the image resolution information.

The communicator is further configured to receive illumination information about illumination of a device reproducing the image, and wherein the processor is further configured to adjust a frame rate of the image according to a change in brightness of a display included in the device by the illumination information and determine the quantization parameter according to the change in the brightness of the display included in the device by the illumination information.

The communicator receives illumination information about illumination of the device reproducing the image, and the processor converts a contrast of the image in accordance with the illumination information, and determines the quantization parameter according to the contrast.

The communicator receives vision information of a user who uses the device reproducing the image, and the processor, in accordance with the vision information, determines that a quantization parameter of a region in which vision of the user is concentrated has a value smaller than a quantization parameter of a region out of the vision of the user.

The communicator is further configured to receive power information indicating that a device reproducing the image is in a low power mode, and wherein, when the power information indicates the low power mode, the processor is further configured to reduce a frame rate of the image or converts a color format of the image and, determine the quantization parameter to be greater than the quantization parameter of the low power mode.

A method of encoding an image, the method being performed by an encoding apparatus, comprises receiving, from a device, device information related to the device; obtaining image information of the image; processing the image according to at least one of the device information and the image information; determining a non-encoding region, a block-based encoding region, and a pixel-based encoding region of the image according to at least one of the device information and the image information; determining a quantization parameter for the block-based encoding region according to at least one of the device information and the image information; performing block-based encoding on the block-based encoding region by using the quantization parameter; performing pixel-based encoding on the pixel-based encoding region; generating an encoded image by entropy encoding a symbol determined in the) block-based encoding and the pixel-based encoding; and transmitting a bitstream comprising the encoded image, region information of the block-based encoding region and the pixel-based encoding region, and quantization information of the quantization parameter to the device.

A decoding apparatus for decoding an encoded image comprises a communicator configured to transmit device information related to a device comprising the decoding apparatus to an encoding apparatus and receive, from the encoding apparatus, the encoded image generated by encoding an image processed according to at least one of the device information and image information of the image, region information of a block-based encoding region to which block-based encoding is applied and a pixel-based encoding region to which pixel-based encoding is applied in a region of the image, and quantization information of a quantization parameter used in an encoding process of the block-based encoding region of the image; and a processor configured to entropy decode the encoded image, perform block-based decoding on a portion corresponding to the block-based encoding region of the entropy decoded image by using the quantization parameter, perform pixel-based decoding on a portion corresponding to the pixel-based encoding region of the entropy decoded image, and reconstruct an image that is to be reproduced by the device by combining the portion corresponding to the block-based encoding region of the block-based decoded image and the portion corresponding to the pixel-based encoding region of the pixel-based decoded image.

The processor generates a transform coefficient by inverse-quantizing a quantized transform coefficient generated by entropy decoding the encoded image corresponding to the block-based encoded region, generates residual data by inversely transforming the transform coefficient, performs block-based compensation based on the residual data to reconstruct a portion corresponding to the block-based encoding region of the image.

The processor reconstructs the residual data by copying a repeated residual string using residual string matching information generated by entropy decoding the encoded image corresponding to the pixel-based encoded region and performs pixel-based compensation using the residual data to reconstruct a portion corresponding to the pixel-based encoding region.

The processor regenerates an index map by copying a repeated index map string using index map string matching information generated by entropy decoding the encoded image corresponding to the pixel-based coding area and regenerates a pixel of a portion corresponding to the pixel-based encoding region of the image using the index map and color information indicated by an index of the index map.

A method of decoding an encoded image, the method being performed by a decoding apparatus, comprises: transmitting, to an encoding apparatus, device information related to a device comprising the decoding apparatus; receiving, from the encoding apparatus, a bitstream comprising the encoded image generated by encoding an image processed according to at least one of the device information and image information of the image, region information of a block-based encoding region to which block-based encoding is applied and a pixel-based encoding region to which pixel-based encoding is applied in a region of the image, and quantization information of a quantization parameter used in an encoding process of the block-based encoding region of the image; entropy decoding the encoded image; performing block-based decoding on a portion corresponding to the block-based encoding region of the entropy decoded image by using the quantization parameter; performing pixel-based decoding on a portion corresponding to the pixel-based encoding region of the entropy decoded image; and reconstructing an image that is to be reproduced by the device by combining the portion corresponding to the block-based encoding region of the block-based decoded image and the portion corresponding to the pixel-based encoding region of the pixel-based decoded image.

A non-transitory computer-readable recording medium having recorded thereon a computer program for executing the encoding method is provided.

A non-transitory computer-readable recording medium having recorded thereon a computer program for executing the decoding method is provided.

Advantageous Effects of the Invention

An encoding region, an encoding method, and an encoding strength of an original image are determined according to device information of a device that reproduces an image. The encoding region, the encoding method, and the encoding strength are determined so that the original image may be compressed as much as possible within a range where no deterioration in image quality is apparent to a user. Accordingly, when encoding according to the encoding region, the encoding method, and the encoding strength, the original image is encoded within the range where no deterioration in the image quality is apparent to the user, thereby reducing a size of the compressed original image transmitted between devices. An amount of power required for data transmission is reduced while the size of the compressed original image is reduced, and thus power stored in a mobile device may be effectively used.

DESCRIPTION OF THE DRAWINGS

FIG. 3 is a flowchart for explaining an embodiment of an encoding method of an encoding apparatus.

FIG. 5 is a flowchart illustrating an embodiment of a decoding method of a decoding apparatus.

FIG. 10 is a diagram for explaining an embodiment of a quantization matrix.

FIG. 11 is a view for explaining an embodiment of a coefficient suppression threshold matrix for adjusting compression strength of an image block.

FIG. 14 is a diagram for explaining an embodiment of a pixel-based prediction method.

FIGS. 15A to 15C are diagrams for explaining an embodiment of a coding method using an index map.

FIG. 16 is a diagram for explaining an LZ77-based matching technique applied in a residual string matching unit and an index map string matching unit.

BEST MODE

Figure 1:
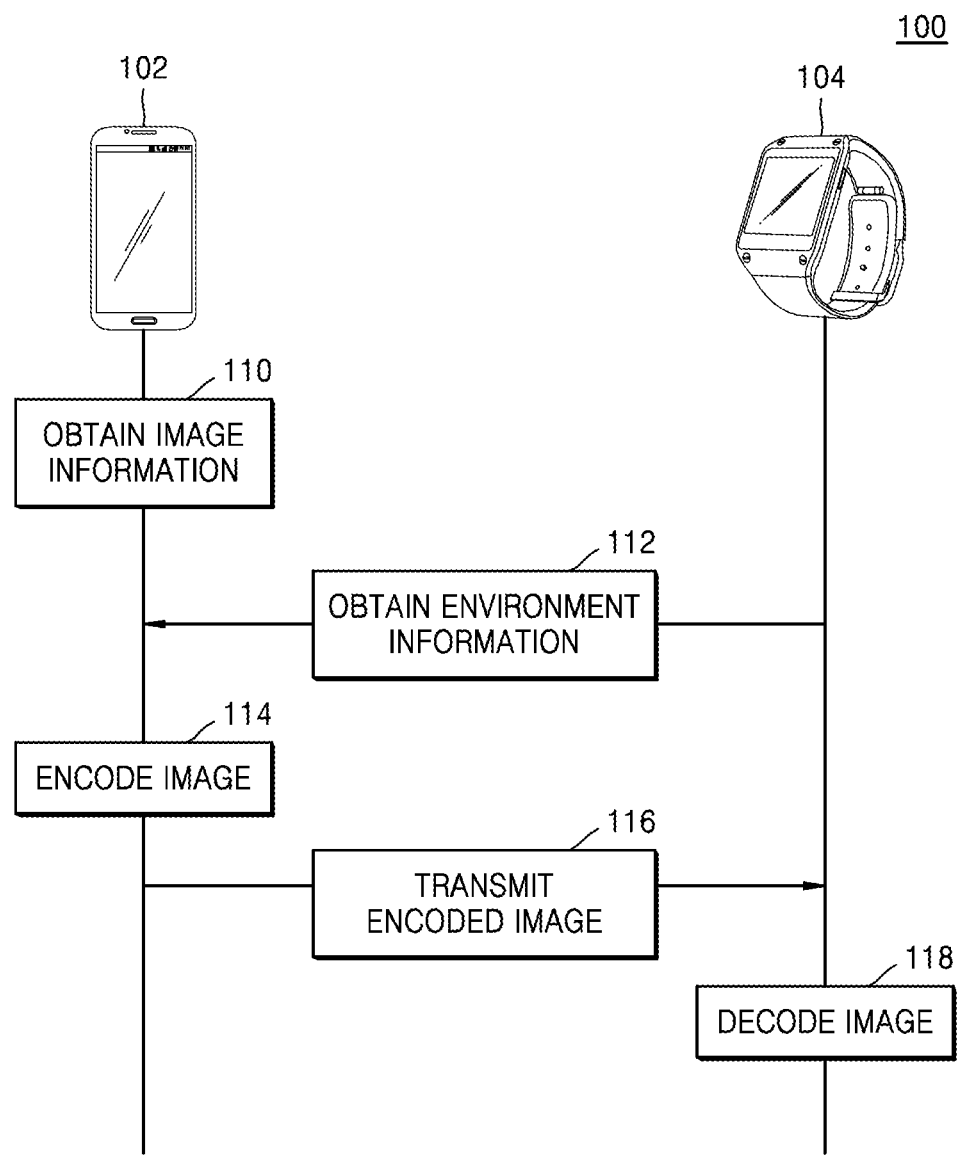
FIG. 1 is a diagram for describing an embodiment of a computer system related to an interaction mechanism between a first device including an encoding apparatus and a second device including a decoding apparatus.

An encoding apparatus for encoding an image comprises: a communicator configured to receive, from a device, device information related to the device; and a processor configured to encode the image by using image information of the image and the device information, wherein the processor is further configured to process the image according to at least one of the device information and the image information, determine a non-encoding region, a block-based encoding region, and a pixel-based encoding region of the image according to at least one of the device information and the image information, performs block-based encoding on the block-based encoding region by using a quantization parameter determined according to at least one of the device information and the image information, perform pixel-based encoding on the pixel-based encoding region, generates an encoded image by entropy encoding a symbol determined by the block-based encoding or the pixel-based encoding, and generate a bitstream comprising the encoded image, region information of the block-based encoding region and the pixel-based encoding region, and quantization information of the quantization parameter, and wherein the communicator is further configured to transmit the bitstream to the device.

A method of encoding an image, the method being performed by an encoding apparatus, comprises receiving, from a device, device information related to the device; obtaining image information of the image; processing the image according to at least one of the device information and the image information; determining a non-encoding region, a block-based encoding region, and a pixel-based encoding region of the image according to at least one of the device information and the image information; determining a quantization parameter for the block-based encoding region according to at least one of the device information and the image information; performing block-based encoding on the block-based encoding region by using the quantization parameter; performing pixel-based encoding on the pixel-based encoding region; generating an encoded image by entropy encoding a symbol determined in the) block-based encoding and the pixel-based encoding; and transmitting a bitstream comprising the encoded image, region information of the block-based encoding region and the pixel-based encoding region, and quantization information of the quantization parameter to the device.

A decoding apparatus for decoding an encoded image comprises a communicator configured to transmit device information related to a device comprising the decoding apparatus to an encoding apparatus and receive, from the encoding apparatus, the encoded image generated by encoding an image processed according to at least one of the device information and image information of the image, region information of a block-based encoding region to which block-based encoding is applied and a pixel-based encoding region to which pixel-based encoding is applied in a region of the image, and quantization information of a quantization parameter used in an encoding process of the block-based encoding region of the image; and a processor configured to entropy decode the encoded image, perform block-based decoding on a portion corresponding to the block-based encoding region of the entropy decoded image by using the quantization parameter, perform pixel-based decoding on a portion corresponding to the pixel-based encoding region of the entropy decoded image, and reconstruct an image that is to be reproduced by the device by combining the portion corresponding to the block-based encoding region of the block-based decoded image and the portion corresponding to the pixel-based encoding region of the pixel-based decoded image.

A method of decoding an encoded image, the method being performed by a decoding apparatus, comprises: transmitting, to an encoding apparatus, device information related to a device comprising the decoding apparatus; receiving, from the encoding apparatus, a bitstream comprising the encoded image generated by encoding an image processed according to at least one of the device information and image information of the image, region information of a block-based encoding region to which block-based encoding is applied and a pixel-based encoding region to which pixel-based encoding is applied in a region of the image, and quantization information of a quantization parameter used in an encoding process of the block-based encoding region of the image; entropy decoding the encoded image; performing block-based decoding on a portion corresponding to the block-based encoding region of the entropy decoded image by using the quantization parameter; performing pixel-based decoding on a portion corresponding to the pixel-based encoding region of the entropy decoded image; and reconstructing an image that is to be reproduced by the device by combining the portion corresponding to the block-based encoding region of the block-based decoded image and the portion corresponding to the pixel-based encoding region of the pixel-based decoded image.

A non-transitory computer-readable recording medium having recorded thereon a computer program for executing the encoding method is provided.

A non-transitory computer-readable recording medium having recorded thereon a computer program for executing the decoding method is provided.

MODE OF THE INVENTION

Hereinafter, embodiments of the present disclosure will be described in detail with reference to the accompanying drawings. It should be understood that the following examples of the present disclosure are for the purpose of illustrating the present disclosure and do not restrict or limit the scope of the present disclosure. It will be understood by those of ordinary skill in the art that various changes in form and details may be made therein without departing from the spirit and scope of the invention as defined by the appended claims.

Software referred to herein may include machine code, firmware, embedded code, application software, and the like. Hardware may also include circuits, processors, computers, integrated circuits, integrated circuit cores, pressure sensors, inertial sensors, micro-electromechanical systems (MEMS), passive components, or combinations thereof.

FIG. 1 is a diagram for describing an embodiment of a computer system 100 related to an interaction mechanism between a first device 102 including an encoding apparatus and a second device 104 including a decoding apparatus.

The computer system 100 includes a first device 102 and a second device 104. The first device 102 may be a client device or a server device. Likewise, the second device 104 may be a client device or a server device.

Various devices may be selected as the first device 102 and the second device 104. For example, the first device 102 or the second device 104 may be a computer device such as a desktop computer, a server, a router, or a laptop computer. And the first device 102 or the second device 104 may be a personal portable device such as a wearable device, a notebook computer, a tablet computer, or a smart phone. The first device 102 or the second device 104 may be a device such as a washing machine, a dryer, and a refrigerator including a display for providing multimedia contents.

Also, the first device 102 and the second device 104 may be communicatively coupled to each other. For example, the first device 102 and the second device 104 may be connected by wireless communication, wired communication, optical communication, ultrasonic communication, or a combination thereof. Specifically, the first device 102 and the second device 104 may be connected by a communication method such as Bluetooth, near field communication (NFC), WiFi, or the like.

In addition, the first device 102 and the second device 104 may be connected by one or more networks. For example, the first device 102 and the second device 104 may be connected by a personal area network (PAN), a local area network (LAN), a metropolitan area network (MAN), a wide area network (WAN) or an arbitrary combination thereof.

Although the first device 102 is shown as a smart phone in FIG. 1, another type of device may be used as the first device 102, depending on an embodiment. Similarly, although the second device 104 is represented as a smart watch, another type of device may be used as the second device 104, depending on an embodiment.

The first device 102 includes an encoding apparatus and the encoding apparatus encodes an image input to the first device 102. The encoding apparatus may encode the image based on image information, environmental information, and the like.

The second device 104 includes a decoding apparatus. The decoding apparatus decodes the encoded image transmitted to the second device 104. The second device 104 reproduces the image reconstructed by the decoding apparatus.

In operation 110, the first device 102 obtains image information about the input image. The image information includes information about characteristics of pixels included in the image. For example, the image information may include information related to the number of pixels included in the image, pixel values of the pixels, and positions of the pixels. Accordingly, the image information may include information about a resolution of the image, color information of the image, an arrangement pattern of pixels, an appearance frequency of a specific pixel value, and the like.

In operation 112, the second device 104 transmits device information about the second device 104 to the first device 102. The device information refers to an environmental factor that affects performance of the second device 104 or an operation of the second device 104. For example, the device information may include an amount of remaining power of the second device 104, display performance, computing capability, ambient temperature, ambient illumination, and the like. Such device information may be stored in the second device 104 or may be detected by a sensor attached to the second device 104. For example, the device information regarding the display performance and the computing capability may be stored in the second device 104. While the device information about temperature and illumination around the second device 104 may be detected by a thermometer and an illuminometer attached to the second device 104. In addition, the device information may be obtained in various ways.

In operation 114, the video input to the first device 102 is encoded based on at least one of image information and device information. An image may be encoded in various ways. For example, the image may be encoded by applying an encoding scheme conforming to a JPEG (Joint Photographic Expert Group) and a JPEG 2000 standard that are still image standard codecs or a Motion Picture Expert Group (MPEG) standard, a MPEG2 (Motion Picture Expert Group) 4 AVC/H.264, HEVC (High Efficiency Video Codec), AVS (Auto Video Coding Standard) that are moving image compression standard codecs, and the like. Also, the image may be encoded by a coding scheme other than the coding scheme conforming to the standard codec mentioned above.

An influence of the image information and the device information on an encoding process will be described in detail in FIGS. 2A, 2B, and 3.

In operation 116, the encoded image is transferred from the first device 102 to the second device 104. The first device 102 may transmit encoding information used for encoding the image together with the encoded image to the second device 104. For example, the encoding information may include information about the standard codec used in encoding, when the image is encoded by a block-based encoding scheme, information about a coding unit, and the like.

In operation 118, the encoded image transmitted to the second device 104 is decoded. A decoding method for decoding the encoded image is determined by the encoding information transmitted together with the encoded image. Since the reconstructed image during a decoding process is optimized for the second device 104, the reconstructed image may be different from an original image. For example, a frame rate of the reconstructed image may be smaller than a frame rate of an original image in consideration of the display performance of the second device 104 and the amount of remaining power. The decoded image is reproduced in the second device 104.

A process of the computer system 100 described in FIG. 1 will now be described in detail in relation to FIGS. 2A through 5.

Figure 2A:
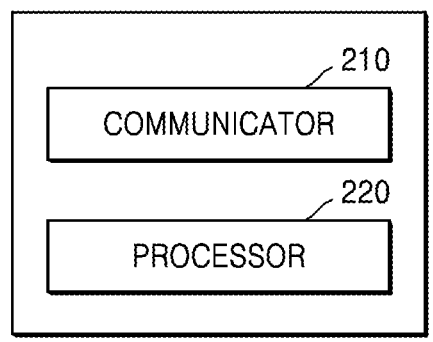
FIGS. 2A and 2B are block diagrams of an embodiment of an encoding apparatus.
Figure 2B:
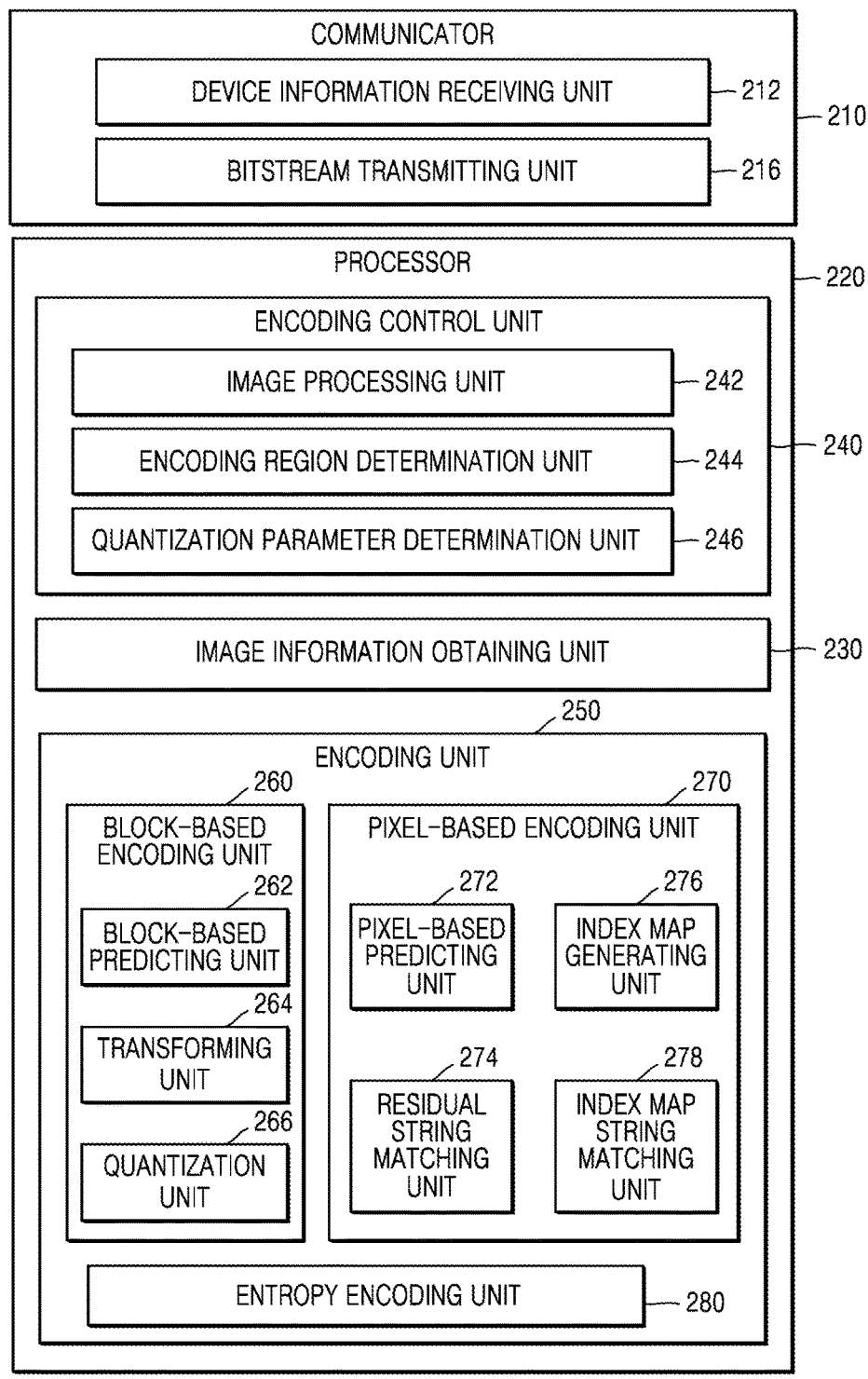

FIGS. 2A and 2B are block diagrams of an embodiment of an encoding apparatus 200 for encoding an image.

FIG. 2A is a block diagram of an embodiment of the encoding apparatus 200 for encoding an image.

The encoding apparatus 200 may include a communicator 210 and a processor 220.

The communicator 210 may receive device information related to the second device 104 from the second device 104.

Also, the communicator 210 may transmit to the second device 104 a bitstream including an encoded image, region information of a block-based encoding region and a pixel-based encoding region, and quantization information of a quantization parameter.

The processor 220 may obtain image information about the image.

The processor 220 may process the image according to an encoding format determined according to at least one of device information and image information.

The processor 220 may determine a non-encoding region, the block-based encoding region, and the pixel-based encoding region of the image according to at least one of the device information and the image information.

The processor 220 may perform block-based encoding on the block-based encoding region using a quantization parameter determined according to at least one of the device information and the image information. The processor 220 may also perform pixel-based encoding on the pixel-based encoding region.

The processor 220 may generate an encoded image by entropy encoding a symbol determined by block-based encoding or pixel-based encoding.

The processor 220 may generate the bitstream including the encoded image, the region information of the block-based encoding region and the pixel-based encoding region, and the quantization information of the quantization parameter.

FIG. 2B is a block diagram of an embodiment of the encoding apparatus 200 for encoding an image.

The encoding apparatus 200 may include the communicator 210 and the processor 220.

The processor 220 may include an image information acquisition unit 230, an encoding control unit 240, and an encoding unit 250.

The communicator 210 may include a device information receiving unit 212 and a bitstream transmitting unit 216.

The device information receiving unit 212 receives device information related to the second device 104 from the second device 104. The device information may include information about performance of the second device 104 or components of the second device 104. For example, the device information may include information about a size or a type of a display included in the device. The device information may include information about an environment of inside or outside the device. For example, the device information may include information about an amount of power of a battery contained in the device or a temperature or illumination outside the device. The device information may include information about an interaction between the device and a user of the device. For example, the device information may include information about a vision or a movement of the user.

The device information receiving unit 212 may receive display shape information related to a shape of the display included in the second device 104 and the display resolution information. The device information receiving unit 212 may receive illumination information about illumination of the second device 104 and vision information of the user using the second device 104. The device information receiving unit 212 may also receive power information indicating that the second device 104 is in a low power mode.

The bitstream transmitting unit 216 transmits a bitstream including an encoded image, region information of a block-based encoding area and a pixel-based encoding region, and quantization information of a quantization parameter to the second device 104.

The image information obtaining unit 230 obtains image information of the image. The image information includes information about characteristics of pixels included in the image. For example, the image information may include information related to the number of pixels included in the image, pixel values of the pixels, and positions of the pixels. Accordingly, the image information may include information about the resolution of the image, color information of the image, the arrangement pattern of the pixels, an appearance frequency of a specific pixel value, and the like.

The image information obtaining unit 230 may obtain color information indicating the number of colors constituting the image. Also, the image information obtaining unit 230 may obtain pixel gradient information indicating values indicating a difference in magnitude of pixel values between adjacent pixels with respect to the pixels included in the image. The image information obtaining unit 214 may obtain pattern information related to a pattern in which the pixels included in the image are distributed. The image information obtaining unit 230 may obtain image resolution information of the image.

The encoding control unit 240 controls encoding by determining an encoding format, an encoding region, a quantization parameter, and the like necessary for encoding the image in the encoding unit 250.

The encoding control unit 240 may include an image processing unit 242, an encoding region determination unit 244, and a quantization parameter determination unit 246.

The image processing unit 242 may process the image according to an encoding format determined according to at least one of the device information and the image information.

The encoding format is an attribute of an image, which is considered for encoding the image, such as a color format, a bit depth, and a frame rate. An amount of computation for decoding the encoded image is determined according to the encoding format. Therefore, the encoding format may be adaptively determined according to the device information and the image information to adjust an amount of calculation for decoding the encoded image. The amount of power consumed in decoding the image is determined according to the amount of calculation for decoding the image, and thus the amount of power consumed by the second device 104 may be kept below a predetermined threshold by adjusting the encoding format.

The image processing unit 242 may determine, from the illumination information, a frame rate of the image according to a change in brightness of the display included in the second device 104. When illumination around the second device 104 is high, the brightness of the display of the second device 104 increases. Thus, the amount of power consumed in the display is increased. Therefore, in order to maintain the amount of power consumed in the second device 104, the image processing unit 242 decreases the frame rate so as to reduce power consumption in decoding the image in the encoding apparatus 200 of the second device 104.

The image processing unit 242 may determine a contrast of the image according to the illumination information. When the illumination around the second device 104 is high, the image processing unit 242 may increase a contrast ratio of the image to improve visibility of the image. Instead, when the contrast ratio of the image increases, the amount of power consumed in the decoding apparatus 200 increases, and thus the frame rate is decreased or the quantization parameter determination unit 246 increases the quantization parameter.

The image processing unit 242 may determine the frame rate of the image or the color format of the image according to the power information. For example, when a battery of the second device 104 is fully charged, the image processing unit 242 may determine a color format of an input image as a YUV 4:4:4 format. As a power level of the battery of the second device 104 decreases, the image processing unit 242 may determine the color format of the input image as a YUV 4:2:0 format or a YUV 4:2:2 format in which Cb-Cr, which is a chroma component, is sampled. When the power level of the battery of the second device 104 is low, the image processing unit 242 may determine the color format of the input image as a monochrome format including only a brightness value Luma component without a color difference component. When the power level of the battery of the second device 104 is close to 0%, the image processing unit 242 may determine the color format of the input image as a binary image format formed by binarizing the input image. The power stored in the battery may be efficiently used by converting the color format according to a battery state of the second device 104. Also, when the power level of the battery of the second device 104 is low, the image processing unit 242 may reduce the frame rate and reduce the amount of power consumed in an encoding process.

The encoding region determining unit 244 determines a region of the image as one of a non-encoding region, a block-based encoding region, and a pixel-based encoding region according to at least one of the device information and the image information.

The non-encoding region is a region that is not encoded. Also, a portion corresponding to the non-encoding region of the image is not transmitted from the first device 102 to the second device 104. Therefore, the portion corresponding to the non-encoding region of the image is not displayed on a display of the second device 104.

The block-based encoding region is a region to which a block-based encoding method is applied. Therefore, a portion corresponding to the block-based encoding region of the image is encoded by the block-based encoding method.

The pixel-based encoding region is a region to which a pixel-based encoding method is applied. Accordingly, a portion corresponding to the pixel-based encoding region of the image is encoded by the pixel-based encoding method. The pixel-based encoding method includes an encoding method using pixel-based prediction or an encoding method using an index map.

The encoding region determining unit 244 may determine a region that is not displayed on the display in the image as the non-encoding region according to the display shape information. For example, if a shape of the image is a rectangle and a shape of the display included in the second device 104 for reproducing the image is a circle, only a center portion of a circular shape of the image is set as the block-based encoding region or the pixel-based encoding region and a remaining portion may be set as the non-encoding region.

The encoding region determining unit 244 may determine a remaining region excluding the non-encoding region as the block-based encoding region or the pixel-based encoding region in various ways. An encoding region determination method will be described in detail in FIGS. 6 and 7.

The quantization parameter determination unit 246 determines a quantization parameter for the block-based encoding region according to at least one of the device information and the image information. If the quantization parameter determination unit 246 increases the quantization parameter, a compression rate of the image increases as a loss of image data increases. Therefore, an amount of computation in a decoding process decreases. As the amount of computation decreases, an amount of power consumed in the decoding process also decreases. Conversely, if the quantization parameter determination unit 246 reduces the quantization parameter, the amount of power consumed in the decoding process is also increased.

The quantization parameter determination unit 246 may determine the quantization parameter according to a ratio of an image resolution and a display resolution calculated from display resolution information and image resolution information. A method of determining the quantization parameter using display resolution information and image resolution information will be described in detail with reference to FIG. 8.

The quantization parameter determination unit 246 may determine the quantization parameter according to the change in brightness of the display included in the device by the illumination information. The quantization parameter determination unit 246 may determine the quantization parameter according to the contrast ratio when the contrast ratio is converted by the illumination information. When the brightness of the display increases since illumination around the display increases or the contrast ratio of the image increases, the amount of power consumed by the second device 104 increases. Therefore, the quantization parameter determination unit 246 increases the quantization parameter when the illumination increases, thereby allowing the amount of consumed power to remain constant.

The quantization parameter determination unit 246 may determine that a quantization parameter of a region where vision of a user of the second device 104 is concentrated has a value smaller than a quantization parameter of a region outside the vision of the user according to vision information. For example, in the case of smart glasses, the user may not grasp deterioration of the image that occurs in a region that is not seen by the user of the smart glasses. Accordingly, the amount of power consumed in the decoding process may be reduced by reducing the quantization parameter in the region where the vision of the user is concentrated and increasing the quantization parameter of the region outside the vision of the user.

The quantization parameter determination unit 246 may determine the quantization parameter according to biometric information. For example, the quantization parameter determination unit 246 may determine a degree of concentration of the user by using bio signal information of the user of the second device 104 such as a heart rate. If concentration of the user is weak, the amount of power consumed by the second device 104 may be reduced by increasing the quantization parameter.

When power information indicates a low power mode, the quantization parameter determination unit 246 may determine the quantization parameter to be larger than the quantization parameter when the power information does not indicate the low power mode. The quantization parameter determination unit 246 may increase the quantization parameter since the amount of power consumed by the second device 104 must be minimized when the second device 104 is in the low power mode.

The encoding unit 250 may include a block-based encoding unit 260, a pixel-based encoding unit 270, an entropy encoding unit 280, and a bitstream generation unit 290.

The encoding unit 250 encodes an image according to the information determined by the encoding control unit 240 and generates a bitstream including the encoded image, region information of the block-based encoding region and the pixel-based encoding region, and quantization information of the quantization parameter.

The block-based encoding unit 260 performs block-based encoding on the block-based encoding region using the quantization parameter. The block-based encoding unit 260 may include a block-based predicting unit 262, a transforming unit 264, and a quantization unit 266.

The block-based encoding unit 260 may encode an image based on a coding unit. The coding unit is described in detail in FIG. 9.

The block-based predicting unit 262 performs intra prediction or inter prediction on the coding unit of the block-based coding region. Intra prediction means prediction of a current block from a spatially adjacent block. Inter prediction refers to prediction of the current block from a reference block of a temporally adjacent reference frame.

The transforming unit 264 transforms residual data generated from intra prediction or inter prediction of the block-based predicting unit 262 to generate transform coefficients. The transforming unit 264 transforms the residual data from a spatial domain into a frequency domain. For example, the transforming unit 264 may transform the residual data by applying Discrete Cosine Transform (DCT) or an integer transform technique in which DCT is integerized. As another example, the transforming unit 264 may transform residual data by applying Discrete Sine Transform (DST). As another example, the transforming unit 264 may transform the residual data by applying Discrete Wavelet Transform (DWT).

The quantization unit 266 quantizes the transform coefficients generated by the transform unit 264 using the quantization parameters to generate quantization coefficients. The quantization unit 266 reduces an amount of information of the transform coefficients, thereby achieving high compression efficiency in an entropy encoding process. The larger the quantization parameter, the smaller the amount of information is, and the smaller the amount of information is, the less the amount of information is reduced.

Since information lost by quantization is not reconstructed in the decoding process, if the quantization parameter is large, quality of a reconstructed image may greatly deteriorate compared with an original image Therefore, the quantization parameter must be selected so that deterioration of the image may not be visually detected. Thus, it is determined whether the selected quantization parameter is appropriate using a coefficient suppression threshold matrix. A quantization matrix is described in detail in FIG. 10 and the coefficient suppression threshold matrix is described in detail in FIG. 11.

Elements of the block-based predicting unit 262, the transforming unit 264 and the quantizing unit 266 and the block-based encoding unit 260 not shown in FIG. 2B described above will be described in detail with reference to FIG. 12.

The pixel-based encoding unit 270 performs pixel-based encoding on the pixel-based encoding region. The pixel-based encoding unit 270 may use an encoding method using pixel-based prediction or an encoding method using an index map.

The pixel-based encoding unit 270 may include a pixel-based predicting unit 272, a residual string matching unit 274, an index map generating unit 276, and an index map string matching unit 278.

The pixel-based predicting unit 272 performs pixel-based prediction for adjacent pixels with respect to each pixel of the pixel-based coding region. The pixel-based predicting unit 272 generates residual data due to pixel-based prediction. The encoding method using pixel-based prediction is described in detail in FIG. 14.

The residual string matching unit 274 matches repeated residual strings of the residual data and compresses the residual data using length of the residual string and position information. The residual string matching unit 274 may apply a LZ77-based matching technique.

The index map generating unit 276 generates an index map including an index corresponding to colors represented by pixels of the pixel-based encoding region. The encoding method using the index map is described in detail in FIGS. 15A to 15C.

The index map string matching unit 278 matches the index map generated in the index map generating unit 276 with repeated index strings of the index map and compresses the index data using length of the index strings and position information. The index map string matching unit 274 may apply the LZ77-based matching technique.

The LZ77-based matching technique applied in the residual string matching unit 274 and the index map string matching unit 274 will be described in detail with reference to FIG. 16.

The entropy encoding unit 280 entropy-encodes a symbol determined by the block-based encoding unit 260 or the pixel-based encoding unit 270 to generate an encoded image. The symbol may be a quantized transform coefficient obtained by block-based encoding. In another example, the symbol may be a compressed residual string or a compressed index string obtained by pixel-based encoding. The entropy encoding unit 280 may compress the quantization coefficient by determining an amount of information of each symbol based on a probability of occurrence of each symbol. Specifically, the entropy encoding unit 280 may determine an information amount of a symbol having a high probability of occurrence to be low, and conversely, determine an information amount of a symbol having a low probability of occurrence to be high, thereby compressing the quantization coefficient.

For example, the entropy encoding unit 280 may apply variable length coding (VLC) to reduce a data amount of quantization coefficient. As another example, the entropy encoding unit 280 may apply Huffman encoding. As another example, the entropy encoding unit 280 may apply arithmetic encoding. Also, the entropy encoding unit 280 may apply a Golomb-Rice encoding technique together with the encoding method or independently. The entropy encoding unit 280 may apply various entropy encoding methods.

When power information indicates a low power mode, the entropy encoding unit 280 may map symbols having a high probability of occurrence among the symbols as values corresponding to achromatic color, and entropy-encode the symbols. Therefore, the amount of power consumed in the display of the second device 104 may be reduced while a color having a high appearance frequency in the image is converted into a dark color.

In FIG. 2B, the communicator 210 and the processor 220 are represented as separate elements, but the communicator 210 and the processor 220 may be combined and implemented as the same element according to an embodiment.

And sub elements belonging to an element may be combined and implemented as a single element. For example, the device information receiving unit 212 and the bitstream transmitting unit 216, which are sub elements constituting the communicator 210, are represented as separate elements. However, the device information receiving unit 212 and the bitstream transmitting unit 216 may be combined and implemented as a single element according to an embodiment.

Further, a plurality of elements may be combined and implemented as a single element regardless of a level of an element. For example, the block-based predicting unit 262, the transforming unit 264, and the quantizing unit 266 may be combined with the quantization parameter determining unit 246 and implemented as a single element.

According to an embodiment, all the elements of the encoding apparatus 200 may be implemented as a single element. For example, functions of all the elements of the encoding apparatus 200 may be implemented by a single apparatus. However, the functions of the elements of the encoding apparatus 200 may be assigned to a plurality of apparatuses and processed according to an embodiment. According to an embodiment, a function of a single element may be processed in parallel by a plurality of apparatuses.

Although the communicator 210 and the processor 220 are represented as elements located in the coding apparatus 200, apparatuses responsible for functions of the communicator 210, the coding control unit 220, and the coding unit 230 do need not physically adjacent to each other. Therefore, the communicator 210 and the processor 220 may be dispersed according to an embodiment. Also, a plurality of apparatuses for processing a function of a single element in parallel may be dispersed.

The encoding apparatus 200 of FIG. 2B is not limited to a physical apparatus. For example, some of the functions of the encoding apparatus 200 may be implemented by software rather than hardware.

FIG. 3 is a flowchart for explaining an embodiment of an encoding method 300 of the encoding apparatus 200.

In operation 310, device information related to a device is received from the device.

For example, display shape information and display resolution information regarding a shape of a display included in the second device 104 may be received. And illumination information about illumination of the second device 104 and vision information of a user using the second device 104 may be received. Also, power information indicating that the second device 104 is in a low power mode may be received.

In operation 320, image information about an image is obtained.

For example, color information indicating the number of colors constituting the image may be obtained. For pixels included in the image, pixel gradient information indicating values indicating differences in magnitude of pixel values between adjacent pixels may be obtained. Pattern information about a pattern in which the pixels included in the image are distributed and image resolution information of the image may be obtained.

In operation 330, the image is processed according to a determined encoding format to be encoded according to at least one of the image information and the device information.

A frame rate of the image may be converted according to a brightness change of the display included in the second device 104 by the illumination information. Also, a contrast ratio of the image may be converted according to the illumination information.

When the power information indicates the low power mode, the frame rate of the image may be reduced or the color format of the image may be converted.

In operation 340, a non-encoded region, a block-based encoded region, and a pixel-based encoded region of the image are determined according to at least one of the device information and the image information.

A region which is not displayed on the display in the image may be determined as the non-encoding region according to the display shape information. A remaining region other than the non-encoded region may be determined as the block-based encoded region or the pixel-based encoded region in various ways. An encoding region determination method will be described in detail with reference to FIGS. 6 to 8.

In operation 350, a quantization parameter for the block-based encoding region is determined according to at least one of the device information and the image information.

The quantization parameter may be determined according to a ratio of an image resolution and a display resolution calculated from the display resolution information and the image resolution information. Further, the quantization parameter may be determined according to the change in brightness of the display included in the device by the illumination information. According to the vision information, the quantization parameter of a region where the vision of the user of the second device 104 is concentrated may be determined to be smaller than the quantization parameter of a region out of the vision of the user.

As another example, the quantization parameter may be determined according to biometric information. When the power information indicates the low power mode, the quantization parameter may be determined to be larger than the quantization parameter when the power information does not indicate the low power mode.

In operation 360, block-based encoding is performed on the block-based encoding region using the quantization parameter. More specifically, intra prediction or inter prediction is performed on a coding unit of the block-based coding region, residual data generated from intra prediction or inter prediction is transformed, and the transformed residual data is quantized to generate the quantization coefficient.

In operation 370, pixel-based encoding is performed on the pixel-based encoding region.

Pixel-based encoding may be performed by performing pixel-based prediction. Specifically, pixel-based prediction for adjacent pixels may be performed for each pixel of the pixel-based encoding region. Then, the residual data generated from pixel-based prediction may be compressed using lengths of residual strings and position information by matching repeated residual strings of the residual data.

Pixel-based encoding may be performed using an index map. Specifically, the index map including an index corresponding to colors represented by pixels of the pixel-based encoding region is generated, and the index map generated by the index map generating unit may be matched with repeated index strings of the index map and may be compressed using lengths and position information of the matched index strings.

In operation 380, a symbol determined by performing block-based encoding and pixel-based encoding is entropy encoded to generate an encoded image.

When the power information indicates the low power mode, symbols having a high probability of occurrence among symbols may be mapped to values corresponding to achromatic color, and then entropy encoded.

In operation 390, a bitstream including the encoded image, the region information of the block-based encoding region and the pixel-based encoding region, and the quantization information of the quantization parameter is transmitted to the device.

Figure 4A:
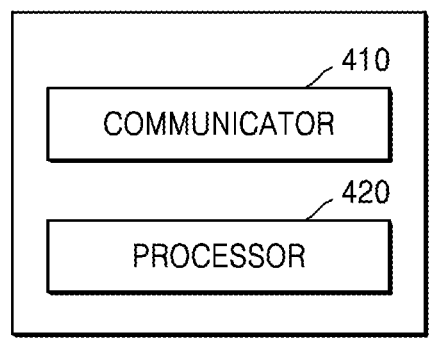
FIGS. 4A and 4B are block diagrams of an embodiment of a decoding apparatus.

FIG. 4A is a block diagram of an embodiment of a decoding apparatus 400.

The decoding apparatus 400 may include a communicator 410 and a processor 420.

The communicator 410 may transmit device information related to a device including the decoding apparatus 400 to an encoding apparatus.

The communicator 410 determines a quality factor of an image according to at least one of the device information and image information related to the image, and receives a bitstream including an encoded image generate by encoding the image, region information related to a block-based encoding region to which block-based encoding is applied and a pixel-based encoding region to which pixel-based encoding is applied among a region of the image, and quantization information of a quantization parameter used in an encoding process of the block-based encoding region of the image, from the encoding apparatus.

The processor 420 may entropy decode the encoded image.

The processor 420 may perform block-based decoding on a portion corresponding to the block-based coding region of the entropy-decoded image using the quantization parameter.

The processor 420 may perform pixel-based decoding on a portion corresponding to the pixel-based encoding region of the entropy-decoded image.

The processor 420 may combine a portion corresponding to the block-based encoded region of the block-based decoded image and a portion corresponding to the pixel-based encoded region of the pixel-based decoded image to reconstruct the image to be reproduced in the device.

Figure 4B:
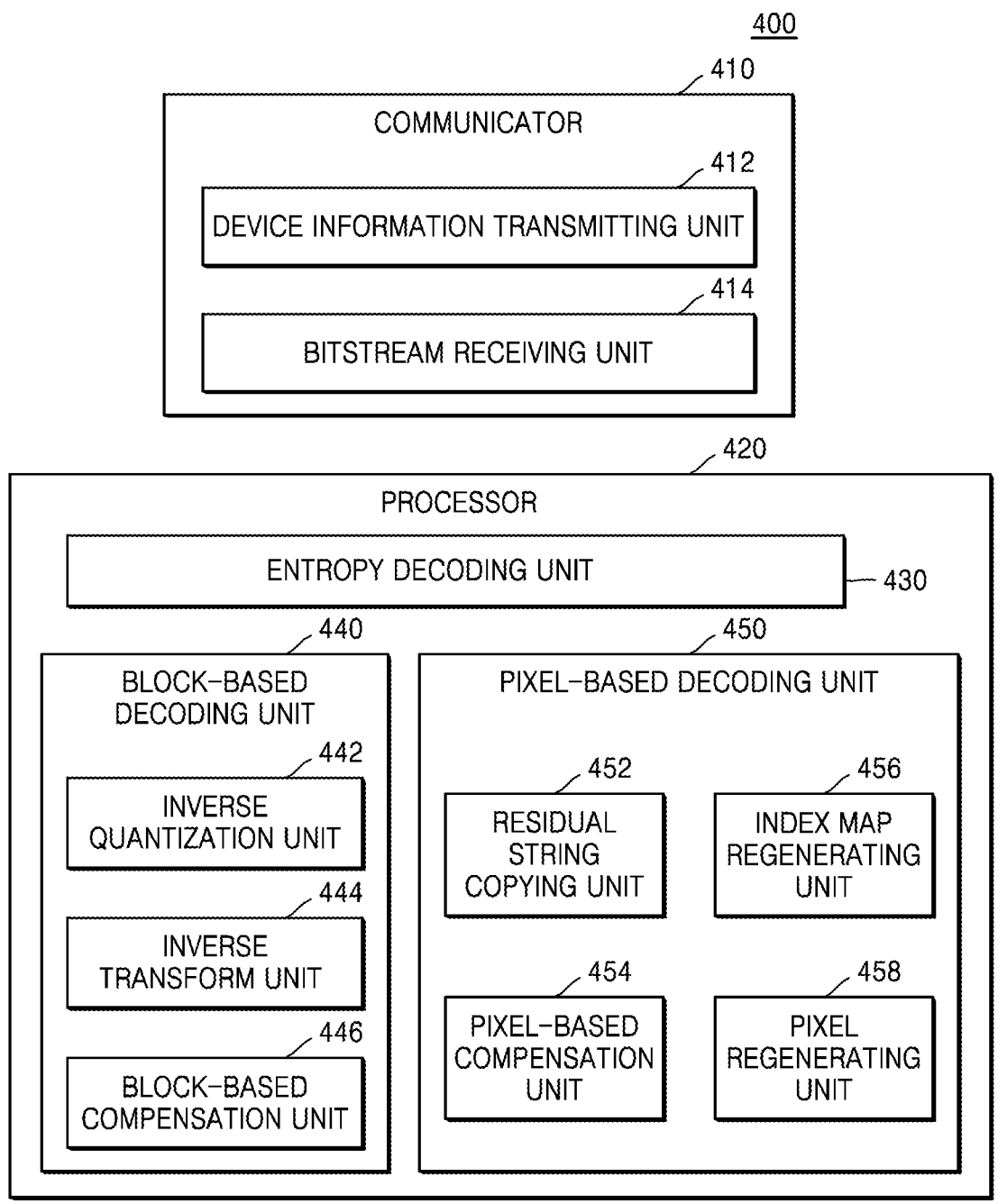

FIG. 4B is a block diagram of an embodiment of the decoding apparatus 400.

The decoding apparatus 400 may include the communicator 410 and the processor 420.

The communicator 410 may include a device information transmitting unit 412 and a bitstream receiving unit 414.

The device information transmitting unit 412 transmits device information related to a device including the decoding apparatus 400 to an encoding apparatus.

The device information transmitting unit 412 may transmit display shape information regarding a shape of a display included in the second device 104 and display resolution information. The device information transmitting unit 412 may transmit illumination information about illumination of the second device 104 and vision information of a user using the second device 104. The device information transmitting unit 412 may also transmit power information indicating that the second device 104 is in a low power mode.

The bitstream receiving unit 414 receives a bitstream including an encoded image, region information, and quantization information from the encoding apparatus.

The region information is information indicating which of the block-based encoding region and the pixel-based encoding region is regions of the image.

The quantization information is information about a quantization parameter applied to block-based encoding regions of the image.

The processor 420 may decode the encoded image.

The processor 420 may include an entropy decoding unit 430, a block-based decoding unit 440, and a pixel-based decoding unit 450.

The entropy decoding unit 430 entropy decodes the encoded image. The entropy decoding unit 430 may entropy-decode the encoded image to obtain a quantized transform coefficient for block-based encoding. The entropy decoding unit 430 may entropy-decode the encoded image to obtain a compressed residual string or a compressed index string for pixel-based encoding.

The block-based decoding unit 440 performs block-based decoding on a portion corresponding to a block-based coding region of the entropy-decoded image using a quantization parameter.

The block-based decoding unit 440 may include an inverse quantization unit 442, an inverse transform unit 444, and a block-based compensation unit 446.

The inverse quantization unit 442 dequantizes the quantized transform coefficients generated by the entropy decoding unit 430 using the quantization parameter to generate a transform coefficient.

The inverse transform unit 444 inversely transforms the transform coefficients generated by the inverse quantization unit 442 to generate residual data.

The block-based compensation unit 446 performs block-based compensation based on residual data in the inverse transform unit 444 and reconstructs a portion corresponding to the block-based coding region of the image.

Elements of the inverse quantization unit 442, the inverse transform unit 444, the block-based compensation unit 446, and the block-based coding unit 440 not shown in FIG. 4 have been described in detail with reference to FIG. 13.

The pixel-based decoding unit 450 performs pixel-based decoding on a portion corresponding to the pixel-based coding region of the entropy-decoded image.

The pixel-based decoding unit 450 may include a residual string copying unit 452, a pixel-based compensation unit 454, an index map regenerating unit 456, and a pixel regenerating unit 458.

The residual string copying unit 452 reconstructs the residual data by copying residual strings repeated using residual string matching information generated by the entropy decoding unit 430.

The pixel-based compensation unit 454 performs pixel-based compensation using the residual data, thereby reconstructing a portion corresponding to the pixel-based encoding region of the image.

The index map regenerating unit 456 regenerates an index map by copying a repeated index map string using index map string matching information generated by the entropy decoding unit 430.

The pixel regenerating unit 458 regenerates a pixel corresponding to the pixel-based encoding region of the image using the index map and color information indicated by an index of the index map. The pixel regenerating unit 458 arranges the regenerated pixels and reconstructs the portion corresponding to the pixel-based coding region.

In FIG. 4, the communicator 410 and the processor 420 are represented as separate elements, but the communicator 410 and the processor 420 may be combined and implemented in the same element.

And sub-elements belonging to an element may be combined into a single element. For example, the device information transmitting unit 412 and the bitstream receiving unit 414, which are sub-elements constituting the communicator 410, are represented as separate elements, but the device information transmitting unit 412 and the bitstream receiving unit 414 may be combined and implemented as a single element.

Further, a plurality of elements may be combined into an element regardless of a level of an element. For example, the inverse quantization unit 442, the inverse transform unit 444, and the block-based compensation unit 446 may be combined with the entropy decoding unit 430 and implemented as a single element.

According to an embodiment, all the elements of the decoding apparatus 400 may be implemented as an element. For example, functions of all the elements of the decoding apparatus 400 may be implemented by a single apparatus. However, according to an embodiment, functions of the elements of the decoding apparatus 400 may be assigned to and processed in a plurality of apparatuses. According to an embodiment, functions of a single element may be processed in parallel by a plurality of apparatuses.

In FIG. 4, the communicator 410 and the processor 420 are represented as an element that is located inside the decoding apparatus 400. However, apparatuses that perform the functions of the communicator 410 and the processor 420 must not be physically adjacent to each other. Accordingly, the communicator 410 and the processor 420 may be dispersed according to an embodiment. Likewise, the sub elements of the communicator 410 and the processor 420 are not necessarily physically adjacent to each other. Also, a plurality of devices for processing functions of a single element in parallel may be dispersed.

The decoding apparatus 400 of FIG. 4 is not limited to a physical apparatus. For example, some of the functions of the decoding apparatus 400 may be implemented by software rather than hardware.

FIG. 5 is a flowchart illustrating an embodiment of a decoding method 500 of the decoding apparatus 400.

In operation 510, device information related to a device including the decoding apparatus 400 is transmitted to an encoding apparatus.

Display shape information about a shape of a display included in the second device 104, display resolution information about a resolution of the display, illumination information about illumination of the second device 104, vision information of a user who uses the second device 104, and power information indicating that the second device 104 is in a low power mode may be transmitted.

In operation 520, a bitstream including an encoded image, region information, and quantization information is received from the encoding apparatus to the decoding apparatus 400.

In operation 530, the encoded image is entropy-decoded.

In operation 540, block-based decoding is performed on a portion corresponding to a block-based coding region of the entropy-decoded image using a quantization parameter.

In operation 550, pixel-based decoding is performed on a portion corresponding to a pixel-based encoding region of the entropy-decoded image.

In operation 560, a portion corresponding to the block-based encoding region of the block-based decoded image and a portion corresponding to the pixel-based encoding region of the pixel-based decoded image are combined to reconstruct an image to be reproduced in the device.

Figure 6:
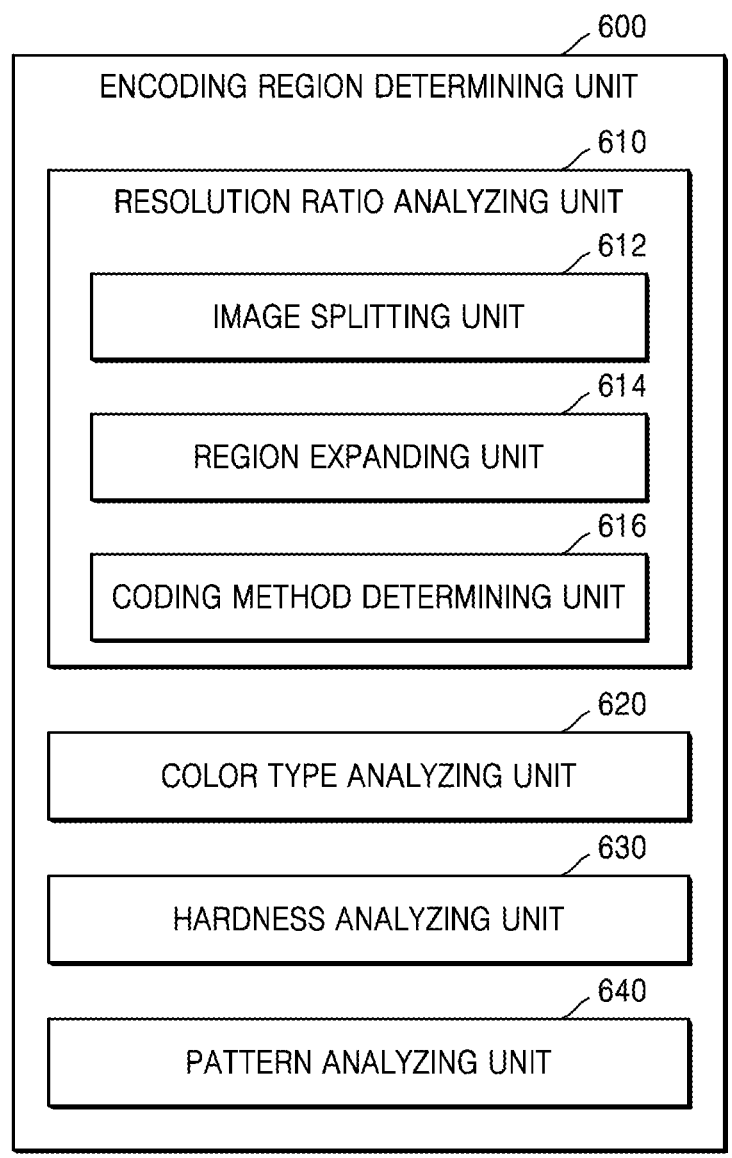
FIG. 6 is a block diagram for explaining an embodiment of an encoding region determination unit.

FIG. 6 is a block diagram for explaining an embodiment of the encoding region determination unit 244.

The encoding region determining unit 244 may include a resolution ratio analyzing unit 610, a color type analyzing unit 620, a hardness analyzing unit 630, and a pattern analyzing unit 640.

The resolution ratio analyzing unit 610 may include an image splitting unit 612, a region expanding unit 614, and a coding method determining unit 616.

The image splitting unit 612 splits the image into a plurality of regions. The region expanding unit 614 expands a size of the split region so that the split region may be split into an integer number of coding units having a predetermined size used in a block-based encoding unit.

The coding method determining unit 616 obtains an area ratio of the expanded region with respect to the unexpanded region and determines the region as one of a block-based coding region and a pixel-based coding region according to the area ratio.

Figure 7:
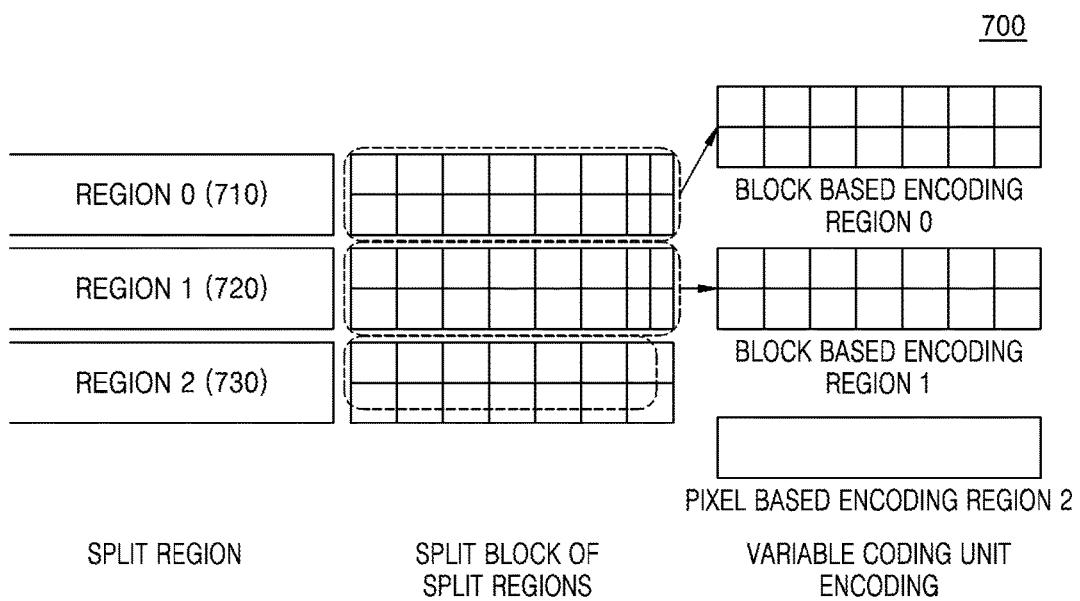
FIG. 7 is a view for explaining an embodiment of a resolution ratio analyzing unit.

An operation of each element of the resolution ratio analyzing unit 610 is described in detail in FIG. 7.

The color type analyzing unit 620 may determine the region as the block-based encoding region or the pixel-based encoding region according to color information acquired by the image information obtaining unit 230. When the number of colors used is less than or equal to a threshold value, a data amount may be effectively reduced when a compression method using an index map is applied.

Therefore, the color type analyzing unit 620 determines a region where the number of used colors is less than the threshold value as the pixel-based encoding region and a region where the number of used colors is equal to or greater than the threshold value as the block-based encoding region.

The hardness analyzing unit 630 determines the region as the block-based encoding region or the pixel-based encoding region according to pixel hardness information acquired by the image information acquiring unit 230.

Examples of hardness of a pixel include horizontal hardness and vertical hardness. The horizontal hardness corresponds to an absolute value of a difference between a current pixel and a right pixel of the current pixel. The vertical hardness corresponds to an absolute value of a difference between the current pixel and a lower pixel of the current pixel.

The hardness analyzing unit 630 may determine the region as the block-based encoding region or the pixel-based encoding region according to a maximum value among vertical hardnesses and horizontal hardnesses of pixels included in the region. A region where the maximum value of the hardness is greater than or equal to a predetermined threshold value is a region where a color change between adjacent pixels is large. Therefore, when block-based encoding is applied to a region where the maximum value of hardness is greater than or equal to the threshold value, there is a high possibility that deterioration of image quality occurs due to quantization loss.

Therefore, the hardness analyzing unit 630 may determine the region as the pixel-based encoding region when the maximum value of hardnesses is equal to or greater than the threshold value, and may determine the region as the block-based encoding region when the maximum value of hardnesses is equal to or smaller than the threshold value.

The hardness analyzing unit 630 may obtain the number of hardnesses having a hardness value of 0 among the vertical hardnesses and the horizontal hardnesses of the pixels included in the region and may determine the region as the block-based encoding regions or the pixel-based encoding regions based on the number of the hardnesses having the hardness value of 0. When the hardness having the hardness value of 0 is equal to or larger than a predetermined threshold value, there is a high possibility that a contrast ratio of the region is small. If an LZ77-based matching technique applied to a pixel-based encoding process described in FIG. 11 is applied to the region having a low contrast ratio, an image corresponding to the region may be efficiently compressed.

Therefore, the hardness analyzing 630 determines the region as the pixel-based encoding region when the hardness having the hardness value of 0 is greater than or equal to the predetermined threshold value, and determines the region as the block-based encoding region when the hardness having the hardness value of 0 is below the predetermined threshold value.

The pattern analyzing unit 640 may determine the region as the block-based encoding region or the pixel-based encoding region according to pattern information acquired by the image information obtaining unit 230. When a distribution pattern of pixels exists and lengths of pixel values repeated according to the distribution pattern are equal to or larger than a threshold value, the image corresponding to the region may be efficiently compressed when the LZ77-based matching technique is applied.

Accordingly, the pattern analyzing unit 640 determines a region in which the distribution pattern of pixels exists and lengths of pixel values repeated according to the distribution pattern are equal to or larger than the threshold value as the pixel-based encoding region and determines a region in which the distribution pattern of pixels does not exist and lengths of pixel values repeated according to the distribution pattern are below the threshold value as the block-based encoding region.

The encoding region determining unit 244 may determine the region as the block-based encoding region or the pixel-based encoding region based on an analysis result of one or more of the resolution ratio analyzing unit 610, the color type analyzing unit 620, the hardness analyzing unit 630, and the pattern analyzing unit 640.

FIG. 7 is a view for explaining an embodiment of the resolution ratio analyzing unit 610.

In FIG. 7, the image splitting unit 612 splits an image into a region 0 710, a region 1 720, and a region 2 730.

The region expanding unit 614 expands sizes of the region 0 710, the region 1 720, and the region 2 730 so that the region 0 710, the region 1 720, and the region 2 730 may be divided into an integer number of coding units used in a block-based encoding unit. The region 0 710 and the region 1 720 were expanded to the right. The region 2 730 was expanded to the right and the bottom.

The region expanding unit 614 may allow pixels newly added by expansion to have arbitrary pixel values. For example, the pixel values of the newly added pixels may all be 128. Also, the region expanding unit 614 may expand a region by copying pixels located at a boundary of an unexpanded region.

The coding method determining unit 616 obtains an area ratio of the expanded region with respect to the unexpanded region. The area ratio is a value obtained by dividing an area of the expanded region by an area of the unexpanded region.

The coding method determining unit 616 determines the region as one of a block-based coding region and a pixel-based coding region according to the obtained area ratio.

Therefore, the coding method determining unit 616 may determine a region having an area ratio equal to or greater than a predetermined threshold as the pixel-based encoding region and a region having an area ratio less than the threshold as the block-based encoding region.

In FIG. 7, the coding method determining unit 616 determines the region 0 710 and the region 1 720 as the block-based coding regions because the area ratio is small and the region 2 730 as the pixel-based coding region because the area ratio is large.

Figure 8:
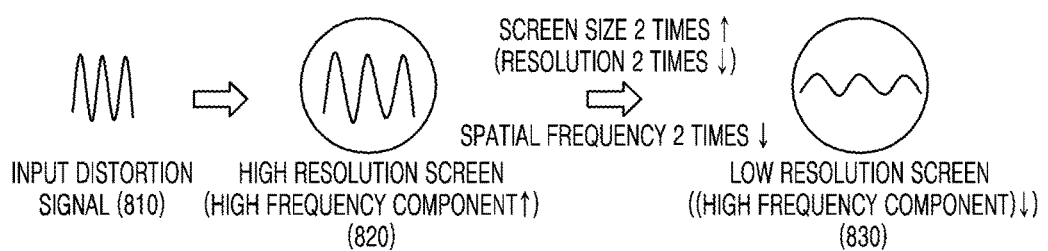
FIG. 8 is a diagram illustrating a distortion recognition sensitivity change according to a change in resolution of a display.

FIG. 8 is a diagram 800 illustrating a distortion recognition sensitivity change according to a change in resolution of a display.

As a display screen becomes smaller, a display resolution increases. A cycle per degree (CPD) component, which is a spatial frequency of an input distortion signal 810, increases in a high-resolution screen 820. When the CPD that is the spatial frequency component increases, a contrast sensitivity function (CSF) value indicating a recognition sensitivity with respect to the frequency component decreases. Thus, as the CSF value decreases, the recognition sensitivity with respect to the input distortion signal 810 also decreases. Therefore, since a distortion sensitivity decreases as the display included in the second device 104 becomes smaller, a quantization parameter determination unit 226 may increase a quantization parameter.

On the other hand, in a low resolution screen 830, the CPD component decreases and the CSF value increases. Thus, the recognition sensitivity with respect to the input distortion signal 810 also increases. Therefore, the quantization parameter determination unit 226 may reduce the quantization parameter.

Figure 9:
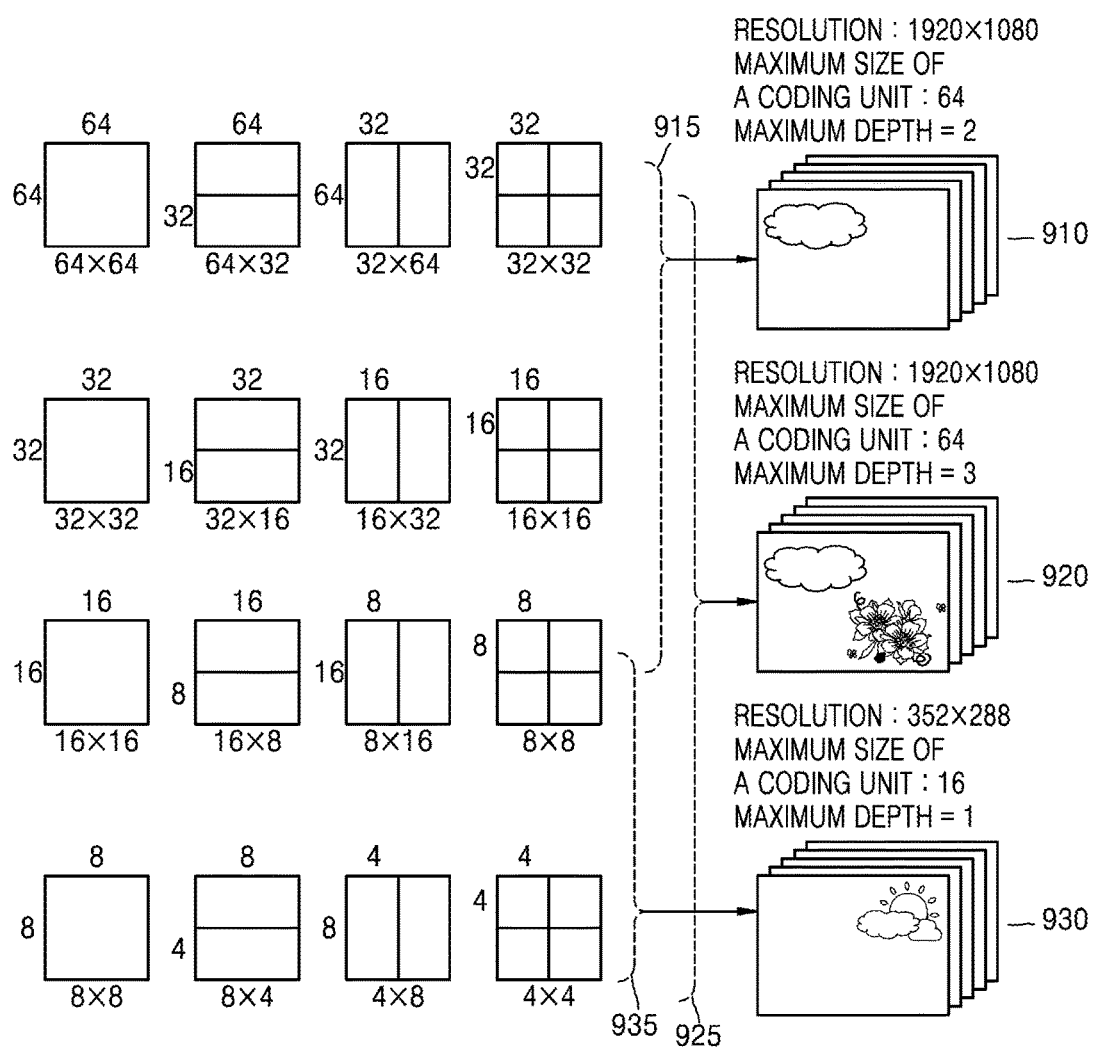
FIG. 9 illustrates a concept of coding units according to an embodiment.

FIG. 9 illustrates a concept of coding units according to an embodiment.

A size of a coding unit may be expressed in width×height, and examples of a coding unit may include coding units having sizes of 64×64, 32×32, 16×16, and 8×8. A coding unit having a size of 64×64 may be split into partitions having sizes of 64×64, 64×32, 32×64, and 32×32. A coding unit of 32×32 may be split into partitions having sizes of 32×32, 32×16, 16×32, and 16×16. A coding unit of 16×16 may be split into partitions having sizes of 16×16, 16×8, 8×16, or 8×8. A coding unit having a size of 8×8 may be split into partitions having sizes of 8×8, 8×4, 4×8, and 4×4.

In video data 910, a resolution is 1920×1080, a maximum size of a coding unit is 64, and a maximum depth is 2. In video data 920, a resolution is 1920×1080, a maximum size of a coding unit is 64, and a maximum depth is 3. In video data 930, a resolution is 352×288, a maximum size of a coding unit is 16, and a maximum depth is 1. The maximum depth shown in FIG. 4 represents a total number of splits from a maximum coding unit to a minimum decoding unit.

If a resolution is high or an amount of data is large, a maximum size of a coding unit may be relatively large to not only increase encoding efficiency but also to accurately reflect characteristics of an image. Accordingly, the maximum size of the coding unit of the video data 910 and 920 having the higher resolutions than the video data 930 may be 64.

Since the maximum depth of the video data 910 is 2, coding units 915 of the vide data 910 may include a maximum coding unit having a long axis size of 64, and coding units having long axis sizes of 32 and 16 since depths thereof are deepened to two layers by splitting the maximum coding unit twice. Meanwhile, since the maximum depth of the video data 930 is 1, coding units 935 of the video data 930 may include a maximum coding unit having a long axis size of 16, and coding units having a long axis size of 8 since depths thereof are deepened to one layer by splitting the maximum coding unit once.

Since the maximum depth of the video data 920 is 3, coding units 925 of the video data 920 may include a maximum coding unit having a long axis size of 64, and coding units having long axis sizes of 32, 16, and 8 since the depths thereof are deepened to three layers by splitting the maximum coding unit three times. As a depth deepens, detailed information may be precisely expressed.

A quantization matrix 1000 of FIG. 10 is an example of a quantization matrix used in a process of encoding an input image into an input bitstream.

Quantization parameters included in the quantization matrix 1000 are used for quantization of transform coefficients corresponding to positions of the quantization parameters in the quantization matrix 1000, respectively.

When the quantization parameters are increased, compression efficiency is increased, but data loss is increased. When the quantization parameters are decreased, the compression efficiency is decreased, but the data loss is decreased.

On the other hand, human eyes recognize a change in a signal corresponding to a DC or a low frequency domain while not recognizing relatively a change in a signal corresponding to a high frequency domain. Therefore, it is determined that a quantization parameter corresponding to the transform coefficient in the high-frequency domain is large and a quantization parameter corresponding to the transform coefficient corresponding to the DC or the low frequency domain is small. Therefore, as shown in FIG. 10, values of the quantization parameters included in the quantization matrix 1000 tend to increase from an upper left to a lower right.

FIG. 11 is a view for explaining an embodiment of a coefficient suppression threshold matrix 1100 for adjusting compression strength of an image block. In order to determine whether a quantization parameter of a quantization matrix is appropriate, a transform coefficient is compared with a reconstructed change coefficient through quantization and inverse quantization. If an absolute value of a difference between the transform coefficient and the reconstructed transform coefficient is smaller than a coefficient suppression threshold value of the coefficient suppression threshold matrix 1100, loss of data may not be detected visually. Therefore, the quantization parameter may be increased.

Conversely, if the absolute value of the difference between the transform coefficient and the reconstructed transform coefficient is larger than the coefficient suppression threshold value of the coefficient suppression threshold matrix 1100, since it is highly possible that the loss of data is visually recognized, the quantization parameter may be reduced.

Figure 12:
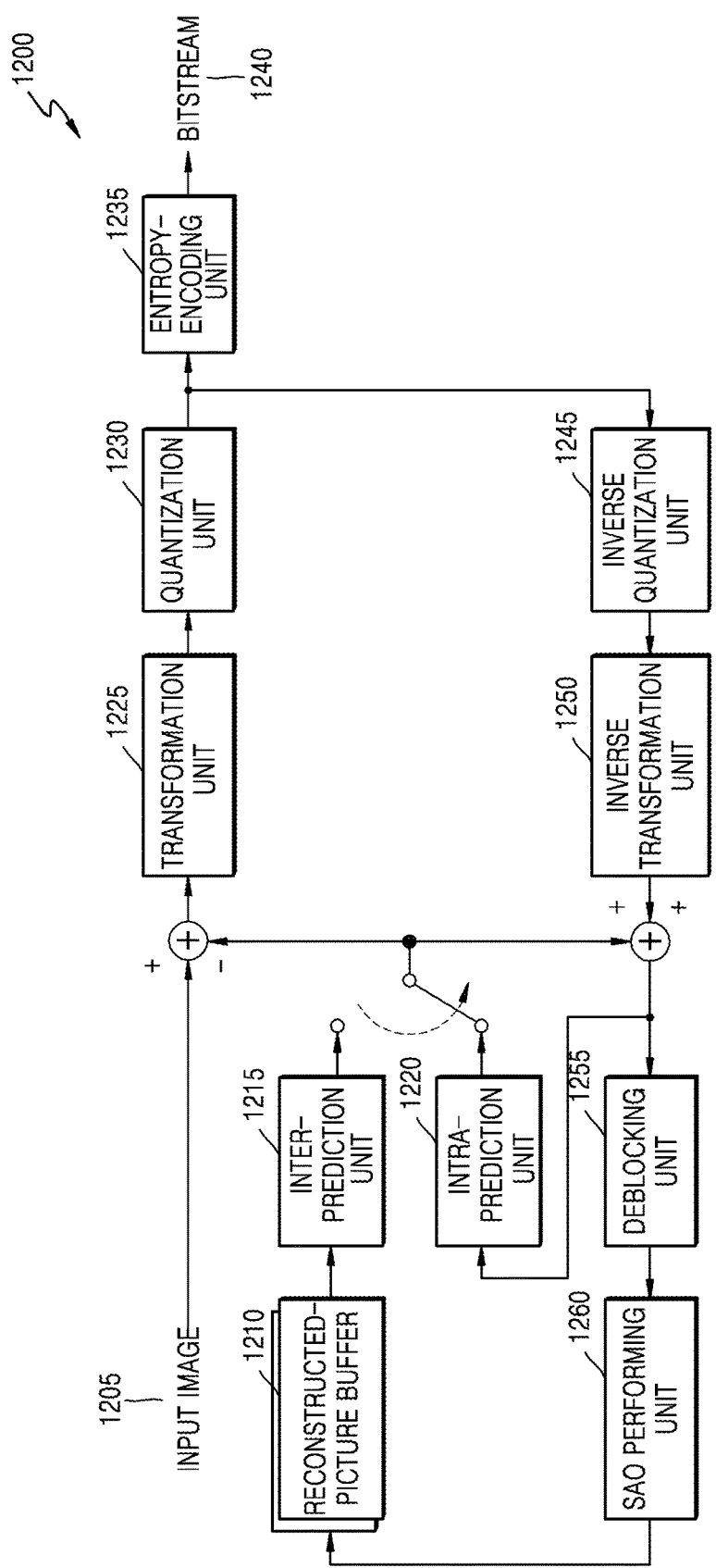
FIG. 12 is a block diagram of a video encoding unit based on coding units, according to an embodiment.

FIG. 12 is a block diagram of a video encoding unit 1200 based on coding units according to an embodiment.

In the video encoding unit 1200 according to an embodiment, an intra-prediction unit 1220 performs intra prediction on coding units of a current image 1205 in an intra-mode in units of prediction units and a inter-prediction unit 1215 performs inter-prediction on coding units in an inter-mode in units of prediction units by using reference images obtained from the current image 1205 and a reconstructed-picture buffer 1210. The current image 1205 may be split into maximum coding units and encoding may be sequentially performed on the maximum coding units. In this case, encoding may be coding units having a tree structure split from each of the maximum coding units.

Residual data is generated by removing predicted data of the coding units of each mode, which is output from the intra-prediction unit 1220 or the inter-prediction unit 1215, from data of encoded coding units of the current image 1205. The residual data is transformed, quantized, and output as transformation coefficients quantized in transform units while passing through a transformation unit 1225 and a quantization unit 1230. The quantized transformation coefficients are reconstructed to residual data in a spatial domain by an inverse quantization unit 1245 and an inverse transformation unit 1250. The reconstructed residual data in the spatial domain is added to the predicted data of the coding units of each mode, which is output from the intra-prediction unit 1220 or the inter-prediction unit 1215, to reconstruct to data in a spatial domain of the coding units of the current image 1205. The reconstructed data in the spatial domain is converted into a reconstructed image while passing through a deblocking unit 1255, and a sample adaptive offset (SAO) performing unit 1260. The reconstructed image is stored in the reconstructed-picture buffer 1110. Reconstructed images stored in the reconstructed-picture buffer 1110 may be used as reference images for performing inter-prediction on other images. The transformation coefficients quantized by the transformation unit 1125 and the quantization unit 1130 may pass through an entropy-encoding unit 1135 and be then output in a bitstream 1140.

In order to apply the video encoding unit 1200 according to an embodiment to the video encoding apparatus 800, all elements of the video encoding unit 1200 (i.e., the inter-prediction unit 1215, the intra-prediction unit 1220, the transformation unit 1225, the quantization unit 1230, the entropy-encoding unit 1235, the inverse quantization unit 1245, the inverse transformation unit 1250, the deblocking unit 1255, the SAO performing unit 1260, and the ALF performing unit 1270) perform operations based on each of coding units having a tree structure of each of the maximum coding units.

In particular, the intra-prediction unit 1220 and the inter-prediction unit 1215 may determine a partition mode and a prediction mode of each of the coding units having the tree structure while considering the maximum size and the maximum depth of a current maximum coding unit. The transformation unit 1225 may determine whether a transformation unit having a quad-tree included in each of the coding units having the tree structure is to be split.

Figure 13:
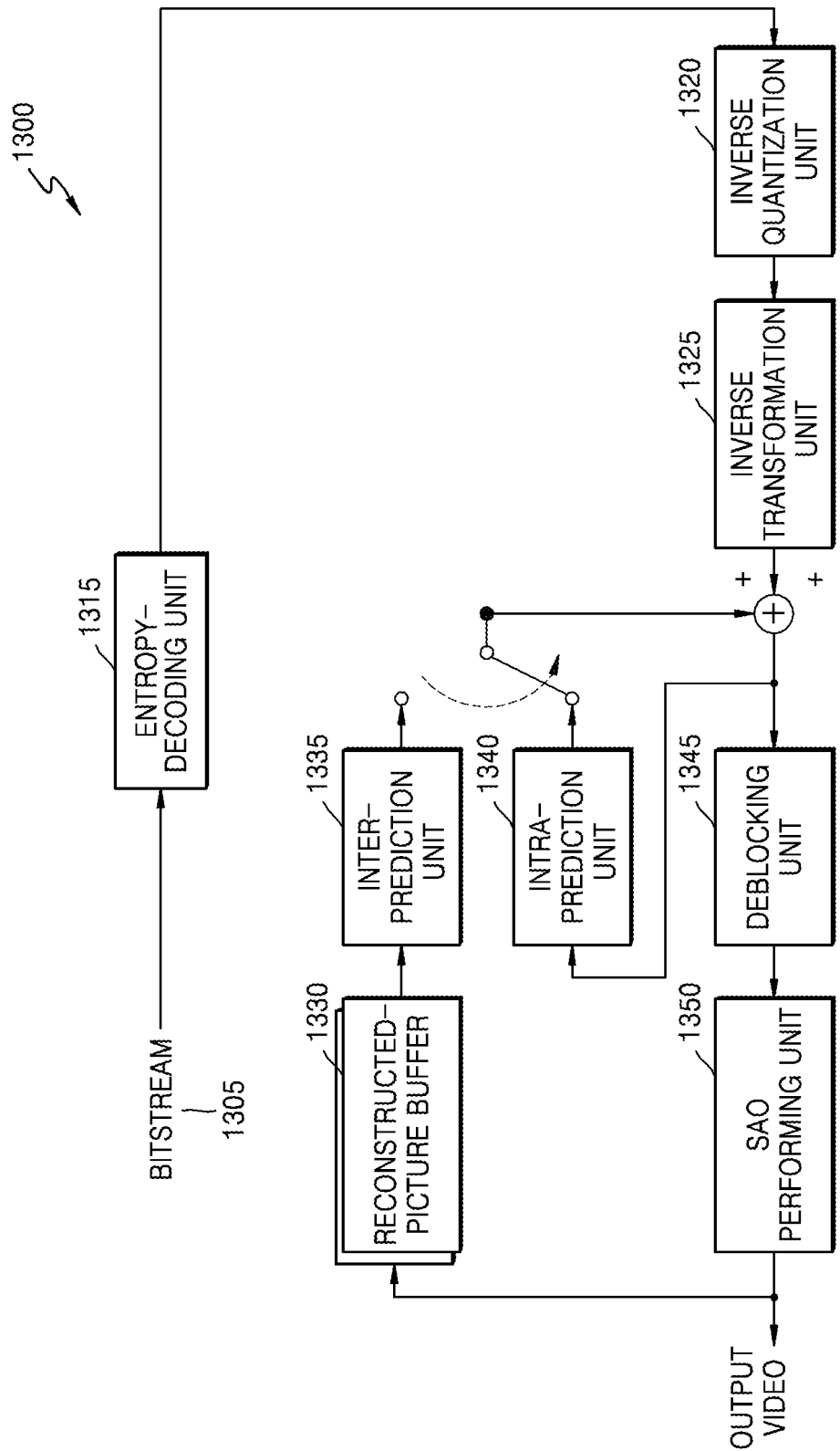
FIG. 13 is a block diagram of a video decoding unit based on coding units, according to an embodiment.

FIG. 13 is a block diagram of a video decoding unit 1300 based on coding units according to an embodiment.

An entropy-decoding unit 1315 parses a bitstream 1305 to obtain encoded image data to be decoded and encoding information needed to decode the encoded image data. The encoded image data is quantized transformation coefficients, and residual data is reconstructed from the quantized transformation coefficients by an inverse quantization unit 1320 and an inverse transformation unit 1325.

An intra-prediction unit 1340 performs intra-prediction on coding units in an intra-mode in units of prediction units. An inter-prediction unit 1335 performs inter-prediction on coding units in an inter-mode of a current image in units of prediction units, based on a reference image obtained from a reconstructed-picture buffer 1330.

Predicted data of coding units of each mode obtained while passing through the intra-prediction unit 1340 or the inter-prediction unit 1335 and the residual data may be added together to reconstruct data in a spatial domain of coding units of a current image, and the reconstructed data in the spatial domain may be output as an output video 1360 while passing through a deblocking unit 1345, an SAO performing unit 1350, and an ALF performing unit 1360. Reconstructed images stored in the reconstructed-picture buffer 1230 may be output as reference images.

Operations after an operation of the entropy-decoding unit 1315 of the video decoding unit 1300 according to an embodiment may be performed.

All elements of the video decoding unit 1300 (i.e., the entropy-decoding unit 1315, the inverse quantization unit 1320, the inverse transformation unit 1325, the intra-prediction unit 1340, the inter-prediction unit 1335, the deblocking unit 1345, the SAO performing unit 1350, and the ALF performing unit 1360) may perform operations based on coding units having a tree structure, in units of maximum coding units.

In particular, the intra-prediction unit 1340 and the inter-prediction unit 1335 may determine a partition mode and a prediction mode for each of coding units having a tree structure, and the inverse transformation unit 1325 may determine whether a transformation unit having a quad-tree included in each of the coding units is to be split.

Figure 14:
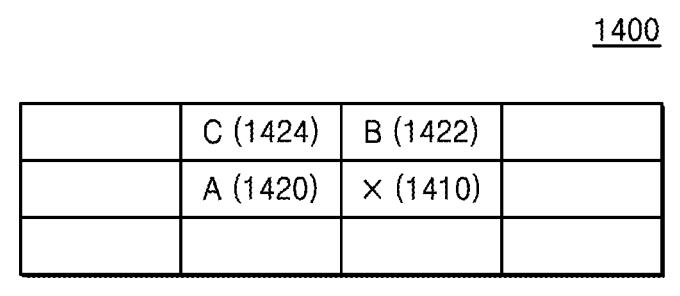

FIG. 14 is a diagram for explaining an embodiment of a pixel-based prediction method 1400.

In general, pixels are scanned from left to right and top to bottom. Therefore, the pixels on the left or the top of current pixels which are currently encoded are used as reference pixels for calculating predicted values of the current pixels. Therefore, when X 1410 in FIG. 14 is the current pixel, A 1420, B 1422, and C 1424 may be reference pixels referred to encode the X 1410.

The predicted value of the current pixel may be calculated in various ways. For example, a pixel value of the pixel located on a left side of the current pixel or a pixel value of the pixel located on an upper side of the current pixel may be a prediction value. An average value of the pixel value of the pixel located on the left side of the current pixel and the pixel value of the pixel located on the upper side of the current pixel may be the prediction value. Or a value obtained by subtracting a pixel value of the pixel positioned at an upper left of the current pixel from a value obtained by adding the pixel value of the pixel located at the upper left of the current pixel to the pixel value of the pixel located at the left side of the current pixel may be the prediction value.

In FIG. 14, one of a pixel value of A 1420, a pixel value of B 1422, an average value of the pixel values of A 1420 and B 1422, and a value obtained by subtracting a pixel value of C 1424 from a sum of the pixel values of A 1420 and B 1422 may be a prediction value of X 1410.

A difference between the pixel value of the current pixel and the prediction value is determined as residual data of the current pixel. In FIG. 14, a difference between the prediction value predicted using A 1420, B 1422, and C 1424, and the pixel value of X 1410 becomes residual data of X 1410.

Figure 15A:
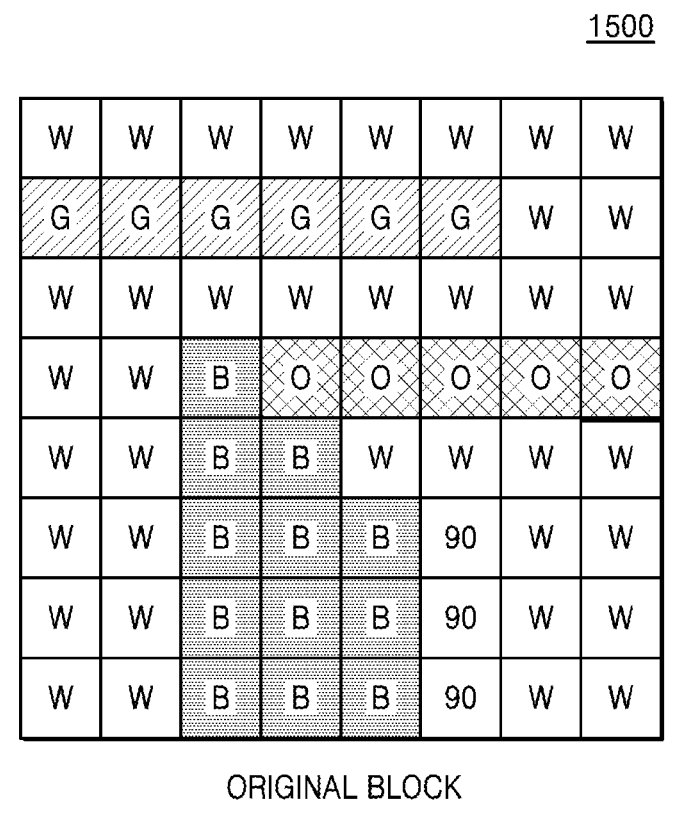
Figure 15B:
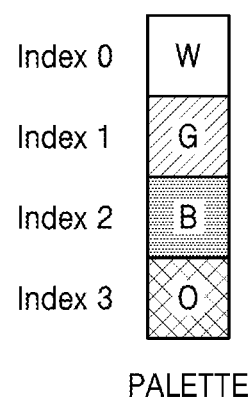

FIGS. 15A to 15C are diagrams for explaining an embodiment of a coding method using an index map.

In FIG. 15A, an original block 1500 is shown. Pixels of the original block 1500 are one of four colors.

FIG. 15B shows a palette 1510 required to generate an index map 1520. Index values are assigned to the four colors used in the original block 1500. An index value for each of the four colors is displayed on the palette 1510. For example, in FIG. 15B, a white index value is 0, a green index value is 1, a blue index value is 2, and an orange index value is 3.

FIG. 15C shows an index map 1520 showing pixels included in the original block 1500 according to the index value displayed on the palette 1510 as an index value. The original block 1500 may be displayed as an index map string in which the index values are listed while pixels of the original block 1500 are represented as index values corresponding to the colors of the pixels.

The encoding method using the index map may effectively reduce an amount of information for expressing the colors of the pixels when the number of colors of pixels used is small, as in the original block 1500 of FIG. 15A. Therefore, when the number of colors of pixels used is small, the encoding method using the index map is mainly applied.

FIG. 16 is a diagram for explaining an LZ77-based matching technique applied in the residual string matching unit 254 and the index map string matching unit 258.

LZ77-based matching technology means that if the same string is repeated, only a first string is left, and a following repeated string is replaced with a pointer indicating a position of an immediately preceding string and a length of the string, thereby compressing the entire string.

For example, an entire string 1600 of FIG. 16 includes 27 characters. Among them, a first string 1602, a second string 1604, and a third string 1606 are 01001100. Since the same string is repeated three times, the second string 1604 and the third string 1606 are replaced by pointers. For example, the first string 1602 is positioned after eight characters from the second string 1604, and a length of the first string 1602 is 8, and thus the second string 1604 may be represented by (8, 8) 1614. The third string 1606 may be represented by (11,8) 1606 since the second string 1604 is located after 11 characters from the third string 1606 and the length of the second string 1604 is 8.

As a result, the entire string 1600 is compressed with the LZ77-based matching technique and represented as a compressed string 1610.

The present disclosure may be applied to JPEG (Joint Photographic Expert Group) for still image compression and MPEG (Motion Picture Expert Group) standard technology for moving image compression, but various compressing methods may be applied not only to a specific compression method.

Meanwhile, the tracking method according to an embodiment of the present disclosure described above may be realized in a general-purpose digital computer by creating a program that may be executed in a computer and operating the program using a non-transitory computer-readable recording medium. The non-transitory computer-readable recording medium includes a storage medium such as a magnetic storage medium (e.g., ROM, floppy disk, hard disk, etc.), an optical reading medium (e.g., CD-ROM.

The embodiments of the present disclosure have been described above. It will be understood by those of ordinary skill in the art that the present disclosure may be embodied in various other forms without departing from the spirit or essential characteristics thereof. Therefore, the disclosed embodiments should be considered in an illustrative rather than a restrictive sense. The scope of the present disclosure is defined by the appended claims rather than by the foregoing description, and all differences within the scope of equivalents thereof should be construed as being included in the present disclosure.

The invention claimed is:

1. An encoding apparatus for encoding an image, the encoding apparatus comprising:
a communicator configured to receive, from a device, device information related to the device; and
a processor configured to encode the image by using image information of the image and the device information,
wherein the processor is further configured to determine a non-encoding region, a block-based encoding region, and a pixel-based encoding region of the image according to at least one of the device information and the image information, performs block-based encoding on the block-based encoding region by using a quantization parameter determined according to at least one of the device information and the image information, perform pixel-based encoding on the pixel-based encoding region, generates an encoded image by entropy encoding a symbol determined by the block-based encoding or a symbol determined by the pixel-based encoding, and generate a bitstream comprising the encoded image, region information of the block-based encoding region and the pixel-based encoding region, and quantization information of the quantization parameter, and
wherein the communicator is further configured to transmit the bitstream to the device.

2. The encoding apparatus of claim 1, wherein the processor is further configured to perform intra prediction or inter prediction on a coding unit of the block-based encoding region, transform residual data generated from intra prediction or inter prediction of a block-based encoding region, and quantize the transformed residual data by using the quantization parameter.

3. The encoding apparatus of claim 1, wherein the processor is further configured to perform pixel-based prediction on an adjacent pixel with respect to each of pixels of the pixel-based encoding region, match residual data generated from pixel-based prediction of a pixel-based encoding region with a repeated residual string of the residual data, and compress the residual data by using a length and position information of the residual string.

4. The encoding apparatus of claim 1, wherein the processor is further configured to generate an index map comprising an index corresponding to colors indicated by pixels of the pixel-based encoding region, match the index map with a repeated index string of the index map, and compress the index map by using a length of the index string and position information.

5. The encoding apparatus of claim 1, wherein the communicator is further configured to receive display shape information about a shape of a display included in a device reproducing the image, and
wherein the processor is further configured to determine a region of the image that is not displayed on the display as the non-encoding region according to the display shape information, and
wherein the non-encoding region is a region that is not encoded.

6. The encoding apparatus of claim 1, wherein the processor is further configured to split the image into a plurality of regions, expand sizes of the split regions such that the split regions are split in an integer number of coding units used by a block-based encoding region, obtain an area ratio of the expanded regions with respect to unexpanded regions, and determine the regions as one of the block-based encoding regions and the pixel-based encoding regions according to the area ratio.

7. The encoding apparatus of claim 1, wherein the processor is further configured to obtain color information indicating the number of colors constituting the image, determine, according to the color information, a region in which the number of used colors is below a threshold value as the pixel-based encoding region, and determine the region in which the number of used colors is above the threshold value as the block-based encoding region.

8. The encoding apparatus of claim 1, wherein the processor is further configured to obtain pixel gradient information indicating values indicating size differences between pixel values of adjacent pixels with respect to pixels included in the image, select a maximum value from among the values indicating the size differences between the pixel values of the adjacent pixels according to the pixel gradient information, determine a region in which the maximum value is above a threshold value as the pixel-based encoding region, and determine a region in which the maximum value is below the threshold value as the block-based encoding region.

9. The encoding apparatus of claim 1, wherein the communicator is further configured to receive illumination information about illumination of a device reproducing the image, and
wherein the processor is further configured to adjust a frame rate of the image according to a change in brightness of a display included in the device by the illumination information and determine the quantization parameter according to the change in the brightness of the display included in the device by the illumination information.

10. The encoding apparatus of claim 1, wherein the communicator is further configured to receive power information indicating that a device reproducing the image is in a low power mode, and
wherein, when the power information indicates the low power mode, the processor is further configured to reduce a frame rate of the image or converts a color format of the image and, determine the quantization parameter to be greater than the quantization parameter of the low power mode.

11. A method of encoding an image, the method being performed by an encoding apparatus and comprising:

receiving, from a device, device information related to the device;
obtaining image information of the image;
determining a non-encoding region, a block-based encoding region, and a pixel-based encoding region of the image according to at least one of the device information and the image information;
determining a quantization parameter for the block-based encoding region according to at least one of the device information and the image information;
performing block-based encoding on the block-based encoding region by using the quantization parameter;
performing pixel-based encoding on the pixel-based encoding region;
generating an encoded image by entropy encoding a symbol determined by the block-based encoding and a symbol determined by the pixel-based encoding; and
transmitting a bitstream comprising the encoded image, region information of the block-based encoding region and the pixel-based encoding region, and quantization information of the quantization parameter to the device.

12. A non-transitory computer-readable recording medium having recorded thereon a computer program for executing the encoding method of claim 11.

13. A decoding apparatus for decoding an encoded image, the decoding apparatus comprising:

a communicator configured to transmit device information related to a device comprising the decoding apparatus to an encoding apparatus and receive, from the encoding apparatus, the encoded image generated by encoding an image and image information of the image, region information of a block-based encoding region to which block-based encoding is applied and a pixel-based encoding region to which pixel-based encoding is applied in a region of the image, and quantization information of a quantization parameter used in an encoding process of the block-based encoding region of the image; and a processor configured to entropy decode the encoded image, perform block-based decoding on a portion corresponding to the block-based encoding region of the entropy decoded image by using the quantization parameter, perform pixel-based decoding on a portion corresponding to the pixel-based encoding region of the entropy decoded image, and reconstruct an image that is to be reproduced by the device by combining the portion corresponding to the block-based encoding region of the block-based decoded image and the portion corresponding to the pixel-based encoding region of the pixel-based decoded image.

* * * * *